(12) United States Patent
Hayward et al.

(10) Patent No.: US 9,823,937 B1
(45) Date of Patent: Nov. 21, 2017

(54) CONFIGURATION SYSTEM AND METHOD FOR AN INTEGRATED COMPUTING SYSTEM

(71) Applicant: VCE Company, LLC, Richardson, TX (US)

(72) Inventors: Jeffery J. Hayward, Lucas, TX (US); Michael Barcello, Pittsboro, NC (US)

(73) Assignee: VCE IP Holding Company LLC, Richardson, TX (US)

( * ) Notice: Subject to any disclaimer, the term of this patent is extended or adjusted under 35 U.S.C. 154(b) by 20 days.

(21) Appl. No.: 14/825,105

(22) Filed: Aug. 12, 2015

(51) Int. Cl.
*G06F 9/44* (2006.01)
*G06F 9/54* (2006.01)
*G06F 9/445* (2006.01)

(52) U.S. Cl.
CPC ............ *G06F 9/44505* (2013.01); *G06F 9/54* (2013.01)

(58) Field of Classification Search
CPC ................. G06F 9/44505; G06F 9/54
See application file for complete search history.

(56) References Cited

U.S. PATENT DOCUMENTS

| | | | |
|---|---|---|---|
| 7,072,728 B2 * | 7/2006 | Montano | G06F 9/4411 700/95 |
| 7,360,071 B2 * | 4/2008 | Ewing | G06F 9/44505 713/1 |
| 8,726,001 B2 * | 5/2014 | Anson | G06Q 30/0603 713/100 |

* cited by examiner

Primary Examiner — Stefan Stoynov
(74) Attorney, Agent, or Firm — Polsinelli PC

(57) ABSTRACT

An integrated computing system configuration system includes a computing system that executes an engine select a plurality of component specifications associated with corresponding components to be implemented in a customized integrated computing system, and for each selected component, abstract the component specification according to its functionality to create a component classification, and validate the component classification according to its interoperability with other component specifications to create a validated component. The engine may then apply one or more rules to at least one of the validated components to verify that the customized integrated computing system meets one or more architectural standards, and when at least one of the rules are not met, perform one or more remedial operations such that the at least one rule is met.

20 Claims, 18 Drawing Sheets

| Rule Identity 1102a | Array Model Code 1102b | Personality 1102c | Optional Personality 1102d | Component Specification 1102e | Operand 1102f | Operand Evaluation 1102g | Minimum Value 1102h | Maximum Value 1102i | Multiple Value 1102j | Dependent Rule 1102k | Dependent Value 1102l | Error Message 1102m |
|---|---|---|---|---|---|---|---|---|---|---|---|---|
| 1 | TRUE | TRUE | TRUE | SSHDD | AND | TRUE | N/A | N/A | N/A | N/A | N/A | Err1 |
| 2 | TRUE | FALSE | FALSE | SSHDD | N/A | FALSE | 10 GB | N/A | N/A | N/A | N/A | Err2 |
| 3 | TRUE | TRUE | FALSE | SSHDD | AND | TRUE | 4 GB | N/A | N/A | N/A | N/A | Err3 |
| 4 | TRUE | FALSE | FALSE | SSHDD | N/A | FALSE | N/A | N/A | N/A | TRUE | SKU# | Err4 |

FIG. 11

CONFIGURATION SYSTEM AND METHOD FOR AN INTEGRATED COMPUTING SYSTEM

TECHNICAL FIELD

Aspects of the present disclosure relate to computing devices and, in particular, to an integrated computing system configuration system and method for and integrated computing system.

BACKGROUND

Computing environments used by enterprises, such as corporations and universities, are often provided by multiple computing devices that function in a collaborative manner to meet the computing resource needs of the enterprise. With the advent of the cloud and increased needs for stable computing environments, integrated computing systems, such as converged infrastructures, were introduced that provide a standardized package of components combined into a single, optimized computing solution. Nevertheless, because the resource needs of each user is often unique, customization of these integrated computing systems remains an area for advancement.

SUMMARY

According to one aspect of the present disclosure, a computing system configuration system includes a computing system that executes an engine select a plurality of component specifications associated with corresponding components to be implemented in a customized computing system, and for each selected component, abstract the component specification according to its functionality to create a component classification, and validate the component classification according to its interoperability with other component specifications to create a validated component. The engine may then apply one or more rules to at least one of the validated components to verify that the customized computing system meets one or more architectural standards, and when at least one of the rules are not met, perform one or more remedial operations such that the at least one rule is met.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however the emphasis instead is being placed on illustrating the principles of the technological concepts. Also, in the drawings the like reference characters refer to the same parts throughout the different views. The drawings depict only typical embodiments of the present disclosure and, therefore, are not to be considered limiting in scope.

FIG. 11 illustrates an example rules table that may be generated by the rules verification module according to one embodiment of the present disclosure.

DETAILED DESCRIPTION

Figure 1A:
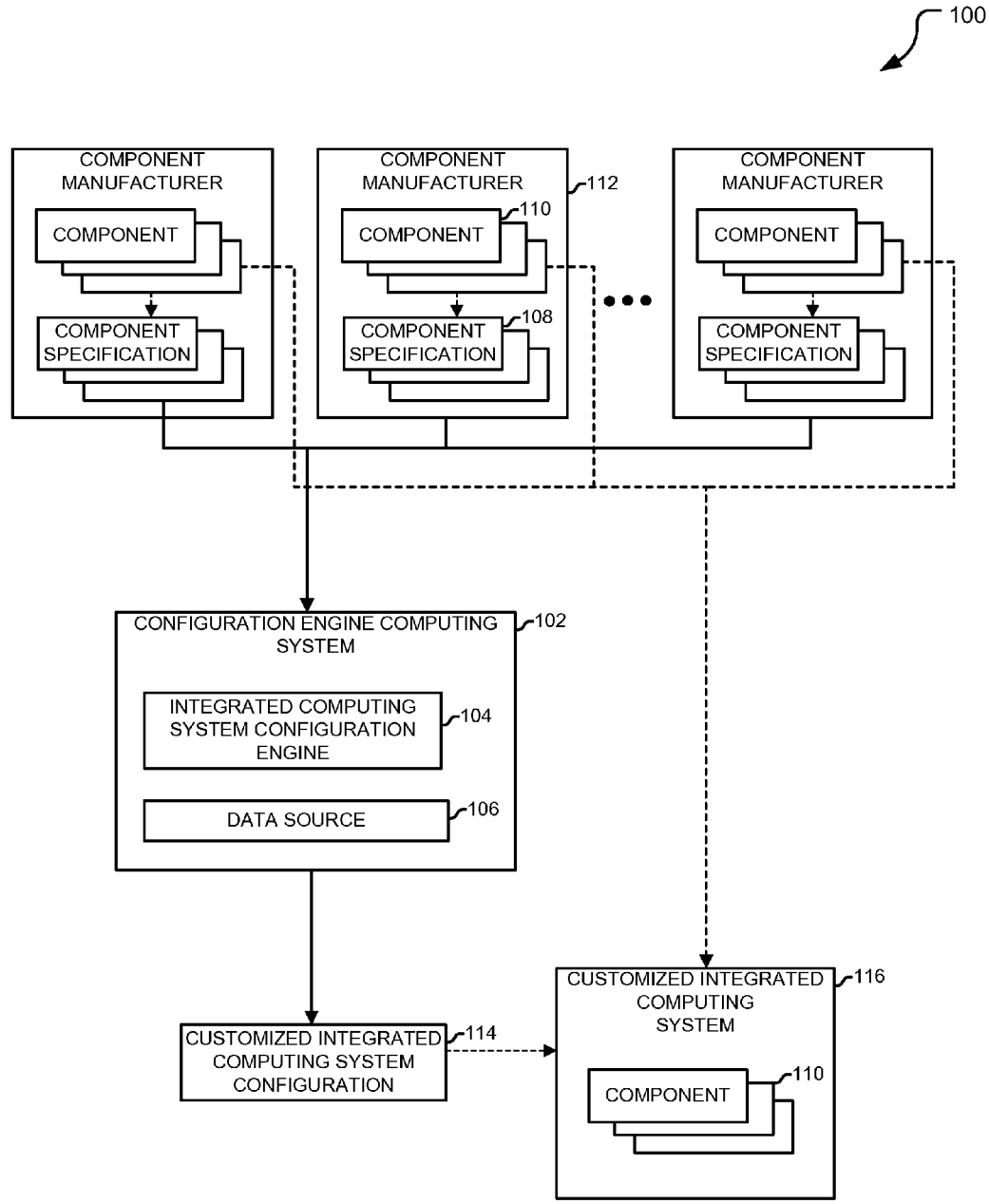
FIGS. 1A and 1B illustrate an example integrated computing system configuration system and associated data source according to one embodiment of the present disclosure.

Embodiments of the present disclosure provide an integrated computing system configuration system and method that provides for unique configuration of integrated computing systems using an abstraction technique that reduces the number of rules required to ensure that the integrated computing system meets certain architectural standards. While conventional integrated computing system configuration systems use rule sets that are relatively large in size, complex in nature, and relatively deterministic due mainly to the relatively large variation in components available for implementation in an integrated computing system, embodiments of the integrated computing system configuration system ensure interoperability of each component and verification according to one or more architectural standards using functionality information associated with each component rather than by using their unique identity (e.g., make, model number, etc.) such that the number and complexity of rules may be reduced. Thus, integrated computing system configurations may be integrated in a shorter time frame than may be provided by conventional integrated computing system configuration systems. Additionally, the shorter time frame may enable the implementation of newly introduced components while avoiding the use of obsoleted or soon to be obsoleted components for implementation in integrated computing systems.

Integrated computing systems typically include multiple individual computing components that have been integrated into a completed (e.g., turn-key) product that function in a collaborative manner to perform one or more distributed services. For example, a typical integrated computing system may include compute resources for execution of application, storage resources for persistent storage of information processed by the compute resources, and network resources for communicatively coupling certain groups of compute resources with certain other storage resources to perform execution of the applications in a structured and cost-efficient manner. In many cases, it has been advantageous from a business perspective to utilize components from multiple different vendors based upon various factors that may include, for example, feature sets provided by various product offerings from certain vendors, and competitive prices at which these feature sets are provided. For example, a typical integrated computing system may be implemented with a sub-system having compute resources provided by one manufacturer (e.g., Dell™), another sub-system having network resources provided by another manufacturer (e.g., Cisco™), and yet another sub-system having storage resources provided by yet another manufacturer (e.g., EMC Corporation™) that utilize their competitive features in a synergistic manner to provide an optimal configuration for the integrated computing system.

Traditionally, integrated computing systems have typically been implemented using a cost-plus business model in which the components of the integrated computing system are initially selected by the customer and then the costs of their integration are negotiated with a supplier of the integrated computing system. Nevertheless, the trend in the industry recently has been to provide a business model in which one or more base integrated computing system models are proposed to a customer from which one of the proposed models may be selected and customized. Thereafter, one or more customer price quotes (CPQs) may be received from the customer that includes a set of specifications detailing certain performance characteristics to be provided by a customized integrated computing system based on of the proposed models. In general, the CPQ may not necessarily specify specific types of vendor equipment to be implemented, but rather provides certain performance characteristics that can be used to select from among multiple products provided by various vendors. A business model such as this may provide for enhanced customization according to the customer's needs while enabling the implementation of components having the greatest capacity to meet those needs at competitive costs.

Nevertheless, conventional techniques used for integrating multiple resources into an optimal integrated computing system configuration have heretofore remained a challenging endeavor. For instance, these conventional techniques typically incur frequent ongoing changes to the manufacturer's product line such that resources selected during initial negotiation with the customer may no longer be available when the integrated computing system is assembled for final delivery to the customer. For example, it has been estimated that current trends in technological development of computing resources often change at the rate of approximately 1.3 changes-per-day. That is, the cumulative amount of changes that occur to components that are typically integrated into customized integrated computing systems can exceed 1.3 changes per day. For example, a processor manufacturer (e.g., Intel Corporation™) that manufactures processors for use in many computer-based components, often introduces a new architecture approximately every 6 months. Since processors, such as these, often form the basis for the design of many components used in an integrated computing system, the components implemented in these processors may evolve on an ongoing basis to utilize the enhanced technology provided by each successive introduction of new processor architecture. Thus, the myriad of components available for integration into an integrated computing system often changes on a frequent, ongoing basis, thus making their integration difficult to achieve in a timely manner.

This problem is exacerbated by the fact that integration of multiple differing components of an integrated computing system may encounter many dependencies that yields a relatively deterministic set of rules that are hierarchally structured. One example dependency may include a maximum number of compute blades from a certain model of compute sub-system that can be paired with a certain type of storage array. Another example dependency may include a minimum network switch size to be used with a certain type of compute sub-system. When taking into account the myriad of differing types of components to be integrated, the number of dependencies can become overwhelming. For example, a typical mid-range integrated computing system may encounter over 1,000 separate dependencies that should be resolved. This problem may be worsened by the fact that an initial proposed configuration may not be able to resolve all dependencies thus requiring that the integration process be re-started with a new initial configuration, which is iteratively time consuming and inefficiently uses the scarce resources of an organization.

Figure 1B:
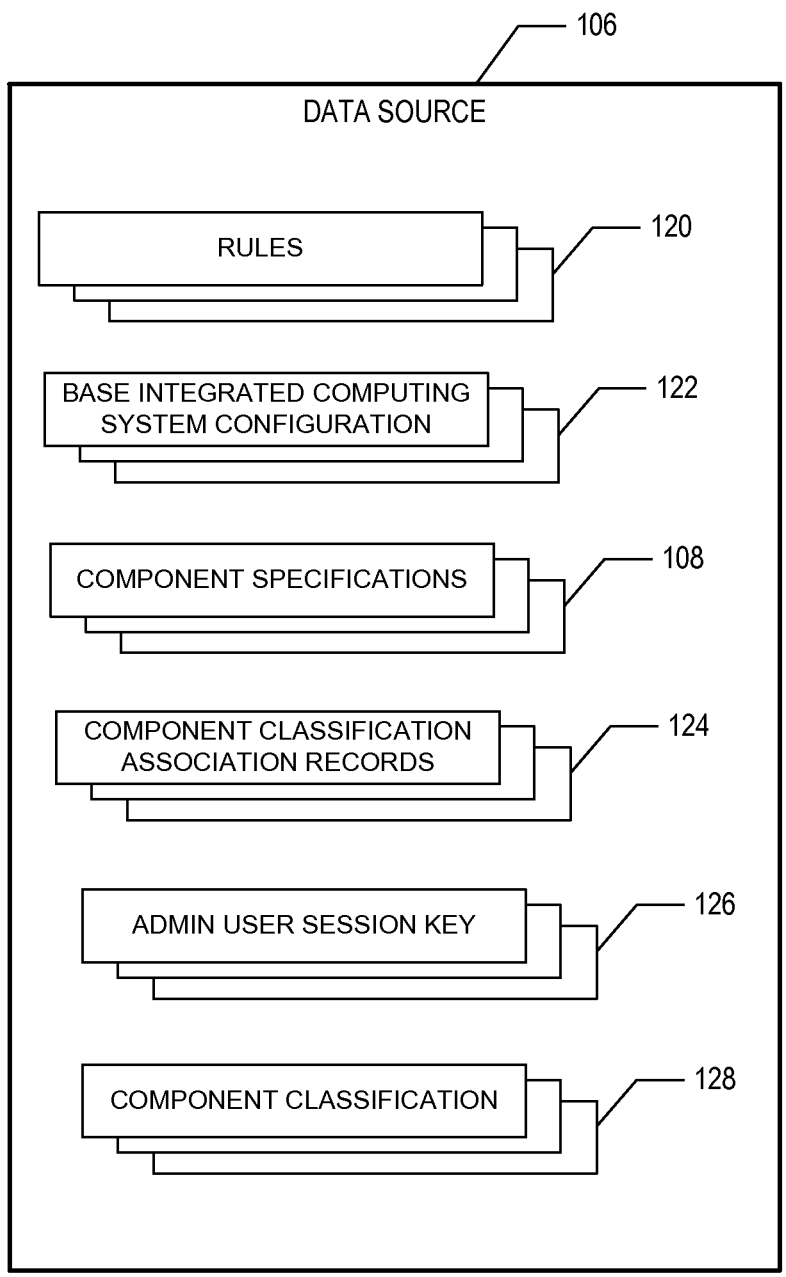

FIGS. 1A and 1B illustrate an example integrated computing system configuration system 100 according to the teachings of the present disclosure. The integrated computing system configuration system 100 addresses the problems discussed above with conventional systems among other benefits and solutions. The system 100 includes a configuration engine computing system 102 having an integrated computing system configuration engine 104, and a data source 106. As will be described in detail below, the integrated computing system engine 104 receives component specifications 108 associated with components 110 provided by multiple component manufacturers 112 to generate a customized integrated computing system configuration 114 associated with a customized integrated computing system 116 having a combined set of the components 110 that have been validated to be interoperable with one another, and/or verified to conform to one or more architectural standards.

The components 110 may include any type that can be integrated into a customized integrated computing system 116. The components 110 may include, for example, data processing devices, data storage devices, servers, networking equipment, environmental control systems, and/or power management systems. In one embodiment, the components 110 may include any type of hardware that provides physical resources that support virtual objects, such as virtual machines, virtual switches, and/or virtual storage objects. These virtual objects may also include logical configuration constructs, such as storage partitions, port groups, virtual private clouds, virtual local area networks (LANs), and private virtual data centers (PVDCs).

In one aspect, the customized integrated computing system 116 includes a combination of these devices that are packaged and interconnected in a standardized manner for ease of maintenance and use. Computing infrastructures (CIs) such as these are often implemented in environments where relatively high reliability and/or availability are desired, such as in an enterprise environment. In one embodiment, the customized integrated computing system 116 includes a CI, such as one of multiple CIs provided by Virtual Computing Environment (VCE) Corporation in Richardson, Tex. Nevertheless, it is contemplated that any computing infrastructure, such as a computer cluster, computing grid, blade array, and/or other computing infrastructure may be configured using the teachings of the present disclosure.

The components 110 used for implementing the customized integrated computing system 116 are selected from among multiple components 110 provided by their component manufacturers 112. The components 110 may include individual components, such as stand-alone computing devices (e.g., a personal computer, such as a laptop or notebook computer, a workstation, or other processing device such as a tablet computer), or a structured combination of computing devices, such as sub-systems involving multiple computing devices, such as a blade array comprising multiple computing devices, a storage array network (SAN) having multiple hard disks, a network switch array having multiple independent switches (e.g., routers), and the like that are each housed in an enclosure and controlled by at least one control system, such as a dedicated computing system configured in the housing. For example, the components 110 may include multiple blades of a blade array provided by one component manufacturer 112 (e.g., Dell™), multiple network switches provided by another component manufacturer 112 (e.g., Cisco™), and/or multiple storage devices configured in a storage sub-system provided by yet another component manufacturer 112 (e.g., EMC Corporation™).

In general, the integrated computing system configuration engine 104 receives component specifications 108 associated with the components 110 provided by each component manufacturer 112, and processes the component specifications 108 to select certain components 110 to be included in the customized integrated computing system 116 in a manner such that all components 110 may be validated for their interoperability with one another, and that the customized integrated computing system 116 meets certain specified architectural standards. The integrated computing system configuration engine 104 initially receives a base integrated computing system configuration 122 including a number of proposed components 110 to be included in the customized integrated computing system 116, and abstracts manufacturer specific information (e.g., make, model, part number, etc.) to include only its functionality, and validates the functionality of each component 110 with one another to ensure compatibility among each component. Thereafter, the integrated computing system configuration engine 104 determines a personality of the base integrated computing system configuration 122 from which certain rules may be applied to ensure that the base integrated computing system configuration meets certain architectural standards. Additionally, the integrated computing system configuration engine 104 may, upon determination of the personality of the base integrated computing system configuration 122, optionally select another base integrated computing system configuration 122 that may be more ideally suited for providing the determined personality of the customized integrated computing system 116.

The base integrated computing system configuration 122 generally refers to one of multiple standardized integrated computing system configurations that may be provided by an integrated computing system provider. For example, an integrated computing system provider may offer multiple standardized integrated computing system configurations (e.g., models) in which each standardized integrated computing system configuration is optimized for providing certain services based upon its costs. Whereas one standardized integrated computing system configuration may be optimized for its networking throughput, another standardized integrated computing system configuration may be optimized for its compute capabilities, while yet another standardized integrated computing system configuration may be optimized for its storage capabilities. The integrated computing system configuration engine 104 provides for configuration of each standardized integrated computing system configuration to add additional components 110, remove certain components 110, or replace certain components 110 such that a customized integrated computing system configuration may be implemented that is customized according to the customer's needs.

The personality of the integrated computing system configuration 114 generally refers to a type of integrated computing system configuration that the combined group of components 110 may be most be most likely to emulate using one or more personality criteria. For example, the integrated computing system configuration engine 104 may detect a personality (e.g., compute intensive integrated computing system, a storage intensive integrated computing system, and/or a network intensive integrated computing system) using the type and quantity of components 110 included in the base integrated computing system configuration 122 from which one or more rules may be applied to ensure that the customized integrated computing system configuration 114 meets certain architectural standards.

Embodiments of the integrated computing system configuration engine 104 may provide certain advantages over conventional integrated computing system configuration systems in that it abstracts components information such that the number of rules to be applied is reduced. Whereas conventional integrated computing system configuration systems often require thousands of rules that are typically applied using component information, which may include manufacturer specific information (e.g., make, model number, etc.), the integrated computing system configuration engine 104 strips this information away such that the number of rules required is greatly reduced. Also, because the number of rules is reduced, the time and cost associated with implementation of customized integrated computing system configurations may also be reduced.

The reduced time may also yield other additional advantages. For example, because technological development of the components used in the customized integrated computing system changes rapidly (e.g., approximately 1.3 changes-per-day), implementations of new customized integrated computing system configurations are not affected to the degree to which those implemented by conventional integrated computing system configuration systems would be. That is, the reduced time required to develop customized integrated computing system configurations reduces or eliminates the exposure of the integrated computing system configuration engine 104 due to ongoing enhancements in the components to be implemented in the customized integrated computing system configuration 114.

The data source 106 stores rules 120, base integrated computing system configurations 122, component specifications 108 associated with components 110 provided by component manufacturers 112, component classification association records 124, and administration session keys 126. The rules 120 include certain criteria that are used by the integrated computing system configuration engine 104 to ensure that the customized integrated computing system configuration 114 meets certain architectural standards. The base integrated computing system configurations 122 store information about various standardized models that may be customized by an integrated computing system provider that uses the integrated computing system configuration engine 104.

In some embodiments, the base integrated computing system configuration 122 may include a configuration associated with an existing integrated computing system, such as one that has been previously customized by the integrated computing system configuration system 100. For example, an existing customized integrated computing system 116 has been built from a customized integrated computing system configuration 114 using the integrated computing system configuration system 100 at a previous point in time (e.g., over 1 year ago). Over the course of time, however, the user (e.g., customer) of that system wishes to add capacity due to their ever expanding needs. In such a case, the configuration 114 for that existing integrated computing system 116 may be obtained and inputted into the integrated computing system configuration engine 104 as a base integrated computing system configuration 122 rom which additional components may be added to provide enhanced capacity needed by the user. The configuration of the existing system may be obtained in any suitable manner. In one particular example, the configuration may be obtained using a self-inventory process or a discovery process in which most or all components may be identified and included in a master BOM, which can then be converted to the base integrated computing system configuration for use by the engine 104.

The component specifications 108 include information associated with each component 110 that may, or may not, be selected for inclusion in a customized integrated computing system configuration 114. For example, the integrated computing system provider that uses the integrated computing system configuration engine 104 may obtain component specifications 108 from component manufacturers 112 for each component 110 provided by that component manufacturer, and store the component specifications 108 in the data source 106. Thereafter, when the integrated computing system configuration engine 104 is executed, it may access the component specifications 108 to select alternative components or additional components to be included in a customized integrated computing system configuration according to information provided in the component specifications 108.

The component classification association records 124 stores information about which components are functionally similar to one another, as well as any variations that certain components 110 may have relative to one another. For example, one component classification association record 124 may include a table, or other data structure, that stores characteristic information about multiple hard disk drives such that, in the event that the integrated computing system configuration engine 104 needs to select an alternative hard disk drive due to a failed rule, it may access the table to identify another hard disk drive that meets certain criteria for meeting the rule that caused the failure.

Figure 2A:
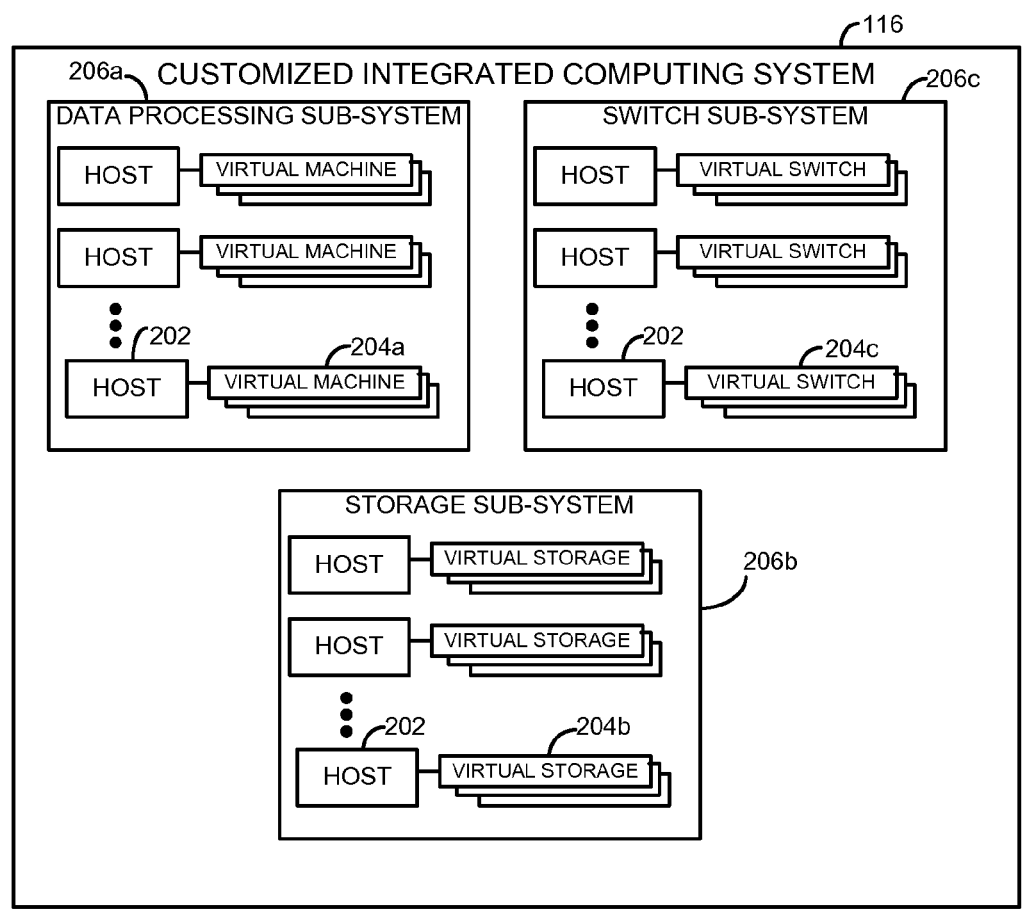
FIGS. 2A and 2B illustrate an example customized integrated computing system that may be configured by the integrated computing system configuration engine according to one embodiment of the present disclosure.

FIG. 2A illustrates an example customized integrated computing system 116 that may be configured by the integrated computing system configuration engine 104 according to one embodiment of the present disclosure. The particular example customized integrated computing system 116 as shown is a converged infrastructure package that is optimized for data storage utilizing various forms of redundancy for enhanced availability and reliability. For example, a customized integrated computing system 116 such as that shown includes components includes components found in VBLOCK™ infrastructure packages available from Virtual Computing Environment (VCE) Corporation, which is headquartered in Richardson, Tex. Nevertheless, other embodiments of a customized integrated computing system 116 may include additional, fewer, or different components than shown herein without departing from the spirit and scope of the present disclosure.

The customized integrated computing system 116 implemented as a converged infrastructure may be any type having multiple hosts 202 that each executes one or more virtual objects (e.g., virtual machines 204a, virtual storage objects 204b, and virtual switch objects 204c). The hosts of a converged infrastructure are often referred to as compute servers. Nevertheless, a 'host' may be any physical device and/or component that support the operation of virtual resources and services provided by those virtual resources. The particular customized integrated computing system 116 as shown includes several sub-systems, such as a data processing sub-system 206a, a data storage sub-system 206b, and a switch sub-system 206c. Nevertheless, it should be understood that other converged infrastructures 104 may include additional, fewer, or different types of sub-systems without departing from the spirit and scope of the present disclosure.

In one aspect, the customized integrated computing system 116 includes a combination of these sub-systems or other sub-systems that are packaged and interconnected in a standardized manner for ease of maintenance and use. Converged infrastructures such as these are often implemented in environments where relatively high reliability and/or availability are desired, such as in an enterprise environment. Nevertheless, it is contemplated that other computing environments and converged infrastructure, such as a computer cluster, computing grid, blade array, and/or other converged infrastructure may be managed using the teachings of the present disclosure. For example, a converged infrastructure 104 such as that shown includes components found in Vblock™ System infrastructure packages available from VCE, LLC, which is headquartered in Richardson, Tex.

In one aspect, the data storage sub-system 206b includes computer-readable memory structures for storing data used by the customized integrated computing system 116, which may include network attached storage (NAS) arrays and/or storage area network (SAN) arrays that are facilitated by multiple virtual objects (e.g., virtual storage objects 204b). The switch sub-system 206c provides for communication among the various sub-systems of the customized integrated computing system 116, and may include components, such as fabric interconnect systems, Ethernet switches/routers, multilayer director switches (MDSs), and the like. The data processing sub-system 206a executes applications that access, store, and otherwise manipulate data stored by the customized integrated computing system 116. For a particular example, either of the data storage sub-system 206b, the switch sub-system 206c, and/or the data processing sub-system 206a may comprise a blade computing platform having multiple hosts (e.g., blade computing devices) 106 that each executes one or more virtual objects.

Each sub-system includes multiple hosts 202 that each executes one or more workloads or one or more virtual objects, which in this particular example, are virtual machines (VMs) 204a, virtual storage objects 204b, and virtual switch objects 204c. For example, virtual objects, such as the VMs 204a may include software-based operating systems that are emulated on their respective hosts, which are physical computing devices. For each host, its respective VMs may be managed by a hypervisor that provides a virtual environment for each VM's operation and controls various aspects of their operation. One example of a suitable hypervisor includes the VMWARE ESX™ software suite that is available from VMware Corporation, which is located in Palo Alto, Calif.

Figure 2B:
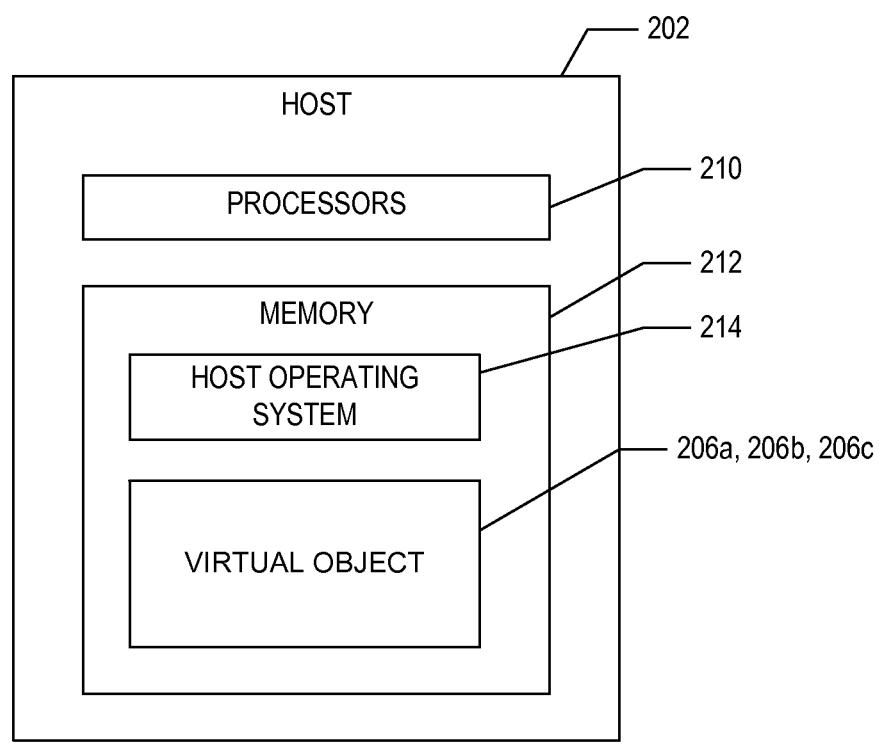

FIG. 2B illustrates an example host 202 implemented on each customized integrated computing system 116 according to one aspect of the application centric compliance management system 100. The host 202 is a computing or processing device that includes one or more processors 210 and a memory 212. For example, the host 202 can be a personal computer, such as a laptop or notebook computer, a workstation, or other processing device such as a personal digital assistant or a tablet computer. In a particular embodiment, the host 202 is a rack mounted host, such as blade host in which multiple blade hosts share a common backplane for communication with one another and for receiving power from a rack mounted power distribution unit. The memory 212 stores a host operating system 214 and one or more workloads or virtual objects (e.g., VMs 204a, virtual storage objects 204b, and virtual switch objects 204c) that are executed by the processor 210. The host operating system 212 controls and manages the operation of the virtual objects executed on the host 202. For example, control signaling for starting, stopping, and/or changing operating parameters of each virtual object is managed through the host operating system 212.

In general, the workloads or virtual objects (e.g., VMs 204a, virtual storage objects 204b, and virtual switch objects 204c) may be implemented as resources 112 of the multi-tier computing environment 116. Each virtual object may be instantiated or deleted under control of the host operating system 214, which is in turn, controlled by the integrated computing system configuration engine 104. That is, the host operating system 214 may be controlled by the integrated computing system configuration engine 104 to instantiate new virtual objects are they are needed and destroyed to alleviate excess capacity in their associated hosts 202.

Although the customized integrated computing system 116 described above discloses one particular type of integrated computing system that may be configured by the integrated computing system configuration engine 104, it should be understood that the integrated computing system configuration engine 104 may be used to configure any computing environment that includes multiple components 110 (e.g., computing clusters, computing grids, blade arrays, etc.) may be viable alternatives.

Figure 3:
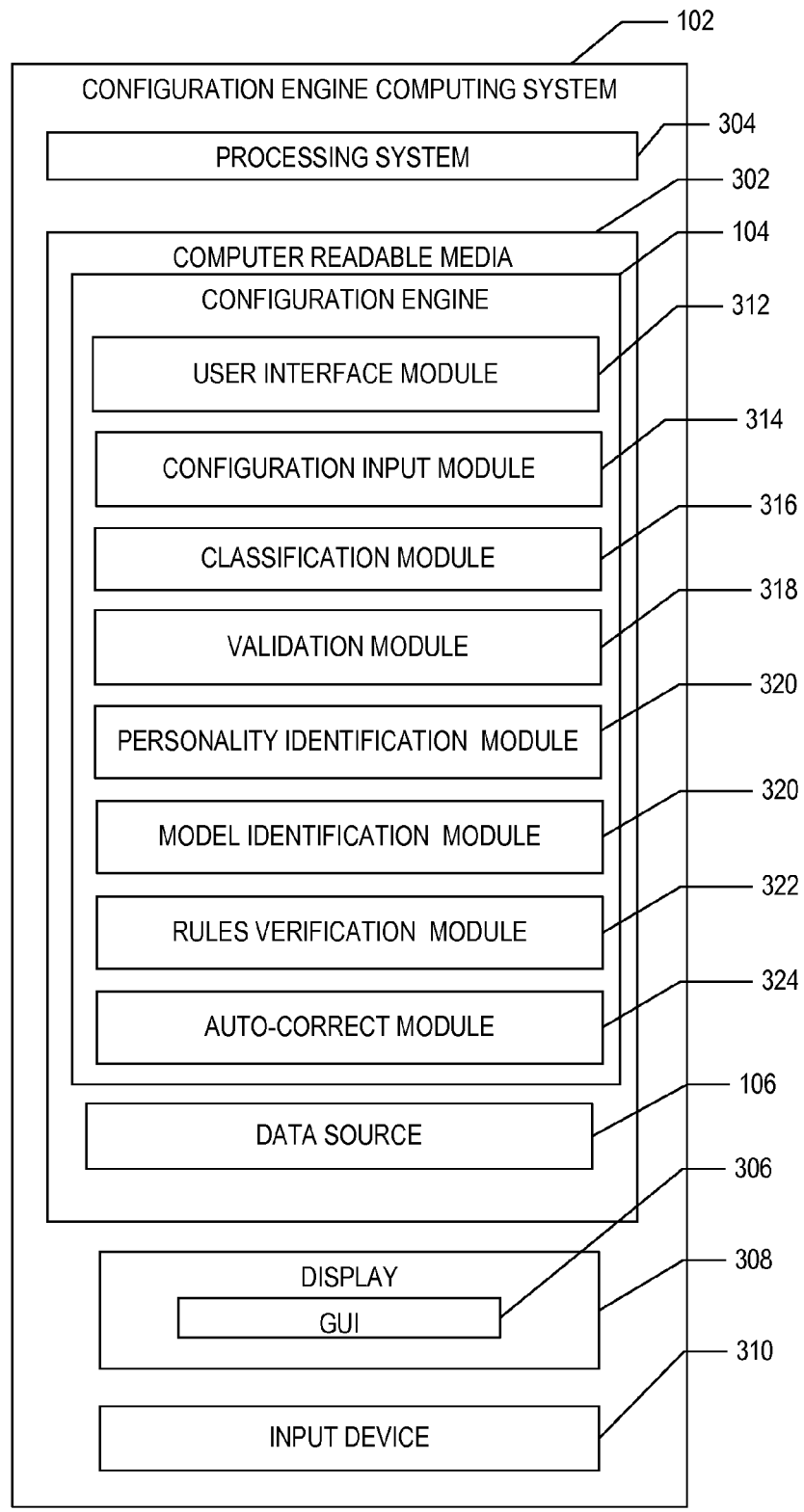
FIG. 3 is a block diagram depicting an example integrated computing system configuration engine executed on the configuration engine computing system according to one embodiment of the present disclosure.

Referring now in more detail to FIG. 3, a block diagram of an example integrated computing system configuration engine 104 executed on the configuration engine computing system 102, is depicted according to one aspect of the present disclosure. The integrated computing system configuration engine 104 is stored in a computer readable media 302 (e.g., memory) and is executed on a processing system 304 of the configuration engine computing system 102. For example, the integrated computing system configuration engine 104 may include instructions that may be executed in an operating system environment, such as a Microsoft Windows™ operating system, a Linux operating system, or a UNIX operating system environment.

The computer readable medium 302 includes volatile media, nonvolatile media, removable media, non-removable media, and/or another available medium. By way of example and not limitation, non-transitory computer readable medium 302 comprises computer storage media, such as non-transient storage memory, volatile media, nonvolatile media, removable media, and/or non-removable media implemented in a method or technology for storage of information, such as computer readable instructions, data structures, program modules, or other data.

According to one embodiment, the configuration engine computing system 102 also includes a graphical user interface (GUI) 306 displayed on the display 308, such as a computer monitor, for displaying data. The configuration engine computing system 102 also includes an input device 310, such as a keyboard or a pointing device (e.g., a mouse, trackball, pen, or touch screen) to enter data into or interact with the GUI 306. According to one aspect, the integrated computing system configuration engine 104 includes instructions or modules that are executable by the processing system 302 as will be described in detail herein below.

A user interface module 312 facilitates the receipt of input data and/or output data from or to a user, respectively. In one example, the user interface 306 may communicate with other modules in the integrated computing system configuration engine 104 to receive user input for manipulating or otherwise modifying the operation of the integrated computing system configuration engine 104. As another example, the user interface 306 may receive user input for modifying and/or reviewing the customized integrated computing system configuration 114 on the display 308.

A configuration input module 314 receives component specifications 108 from one or more component manufacturers 112. Each component specification 108 may include information associated with components 110 provided by their respective component manufacturer 112, and is stored by the configuration input module 314 in the data source 106. Each component specification 108 may include a list of operating parameters (e.g., stock keeping unit (SKU) number, manufacturer name (make), part number, processor speed, storage capacity, networking throughput level, physical dimensions, etc.) that each associated component is guaranteed to provide. In one embodiment, a group of component specifications 108 may be provided by the component manufacturer 112 as a list, such as a bill of materials (BOM), associated with a sub-system having multiple components. Examples of such sub-systems may include a blade array comprising multiple compute devices, a storage array network (SAN) having multiple hard disks, a network switch array having multiple independent switches (e.g., routers), and the like that are each housed in an enclosure and controlled by at least one control system, such as a dedicated computing system configured in the housing.

In a particular example, a component manufacturer 112 that manufactures multiple different models or versions of a particular type of sub-system (e.g., a blade array, a storage array, a network switch array, an electrical power distribution rack, etc.), may provide a component specification list (e.g., BOM) for each model that includes specific information about each component included in that sub-system. In some cases, the component specifications 108 may be provided as a list, and may also comprise an itemized price quote that includes pricing information associated with its respective sub-system, and some or all components included in the sub-system. The component list may be provided in any suitable format, such as an extensible markup language (XML) file that includes all relevant information associated with the components and their itemized pricing.

A classification module 316 abstracts non-parametric information from each component specification 108. That is, the classification module 316 may remove information, such as stock keeping unit (SKU), make, and model information, which does not specifically pertain to the operation or functionality of the component, while keeping other parametric information, such as storage capacity, processing speed, physical dimensions, and the like. Parametric information associated with the component 110 may be obtained from the component specification 108 or from some other suitable source, such as a component specification association record 124 associated with that component. For example, if the component specification only includes non-parametric information (e.g., make, model number, etc.), the component classification module 316 may use the non-parametric information obtained from the component specification 108 for accessing a component specification association record 124 for that component to obtain the parametric information about the component 110 to be included as non-parametric information for the component 110.

A validation module 318 obtains the abstracted component specifications, and validates each component for interoperability with one another. For example, if the validation module 318 encounters a blade array, it may determine its minimum power requirements and ensure that the power distribution system for that blade array is capable of providing that minimum level of electrical power. As another example, if the validation module 318 encounters a certain component 110, it may check to ensure that the bay or other structure it is intended to be housed in has proper physical dimensions for housing that component 110.

A personality identification module 320 derives a personality for the customized integrated computing system 116 using component specifications that have been abstracted by the classification module 316 and validated by the validation module 318. The integrated computing system personality 804 generally refers to a type of integrated computing system configuration that the combined group of components 110 may be most be most likely to emulate using one or more personality criteria. For example, when the personality identification module 320 identifies certain network attached storage components 110 in the integrated computing system configuration 114, it may determine that the configuration of the integrated computing system 114 is most likely adapted to providing a unified storage system, such as one that can combine locally configured storage mediums (e.g., hard drives, flash drives, etc.) and network attached storage mediums (e.g., network attached storage) using low level system calls that enable seamless operation and/or various redundancy (e.g., redundant array of inexpensive disk (RAID), etc.) schemes. In such a case, the personality identification module 320 generates an integrated computing system personality 804 indicating that the component specifications 108 are associated with an integrated computing system having a unified storage system.

In one embodiment, the personality identification module 320 may utilize nested criteria to determine an integrated computing system personality of the component specifications 108. A nested criteria generally refers to a first (e.g., optional) personality criteria to be applied when a first personality criteria is met. For example, when the personality identification module 320 determines that the component specifications 108 indicates a unified storage personality, it may further examine the component specifications 108 to determine what type of unified storage integrated computing system that an integrated computing system associated with the component specifications 108 may possess. That is, the personality identification module 320 may, upon determining that network components are optimally configured to provide network access to a publicly available communication network, such as the Internet, generate an integrated computing system personality indicating that the component specifications 108 are associated with an integrated computing system having a unified storage system configured to operate using a network-based protocol, such as a lightweight directory access protocol (LDAP).

The personality identification module 320 may also determine a personality according to one or more characteristics associated with certain components associated with the component specifications 108. The characteristics of the components may be any particular type that affects the overall operating performance of the integrated computing system represented by the component specifications 108. Examples of such characteristics may include a combined storage capacity of the storage mediums configured in the integrated computing system (e.g., the quantity of hard drives multiplied by the storage capacity of each hard drive), a combined performance capacity of the compute devices configured in the integrated computing system (e.g., an instruction processing rate of each compute device (e.g., instructions per second (IPS) rate multiplied by the quantity of compute devices configured in the integrated computing system.

A model identification module 322 compares the component specifications 108 and the determined integrated computing system personality from the personality identification module 320 with multiple base integrated computing system configurations 122 stored in the data source 106 to generate a customized integrated computing system configuration 116 for display on the display 308. That is, the model identification module 322 generates a customized integrated computing system configuration 114 that includes some, most, or all components initially specified in the base integrated computing system configuration 122 and additional components as specified in the component specifications 108 to generate the customized integrated computing system configuration 114.

A rules verification module 324 compares the component specifications 108 in the received integrated computing system configuration against one or more rules 120 stored in the data source 106 to ensure that the customized integrated computing system 116 associated with the integrated computing system configuration 114 meets certain architectural standards. The architectural standards typically refers to certain guidelines that are to be adhered to for ensuring that any integrated collection of components function in a collaborative manner meet certain performance objectives, such as a minimum level of redundancy to provide failover tolerance, physical memory separation for security purposes, or a minimum level of processing power (e.g., IPS) to be provided for certain types of applications to ensure that certain performance objectives are met. In one embodiment, the architectural standards may include certain rules associated with an established compliance level, such as a payment card industry (PCI) compliance level, or a Health Insurance Portability and Accountability Act (HIPAA) compliance level.

An auto-correct module 326 may be provided to correct or fix unverified component specifications in the customized integrated computing system configuration 114. For example, the auto-correct module 326 may receive user input via the user interface module 312 to automatically fix an un-verified component 110 by one or more techniques, such as replacing the component 110 with another component 110, removal of the component 110 from the customized integrated computing system configuration 114, addition of a new component 110, and/or the addition, replacement, removal of one or more other components 110 in the customized integrated computing system configuration 114.

For example, the auto-correct module 326 may receive an unverified component specification, identify the type of component associated with the unverified component specification and/or one or more of its characteristics, and select an optional component specification from the component specifications 108 according to the identified type of component and/or its characteristics. For example, if the unverified component specification is associated with a hard disk drive having a 2.5 inch form factor, the auto-correct module 326 may select an optional hard disk drive component from the component specification records having similar characteristics, but with a 1.5 inch form factor. Once the component specification associated with the 2.5 inch form factor is replaced with the other having the 2.5 inch form factor, the updated integrated computing system configuration may again be submitted to the rules verification module 324 for verification against the rules.

In one embodiment, the auto-correct module 326 may also provide auto-correction of the physical layout of the integrated computing system configuration in one or more racks. For example, if the customized integrated computing system configuration 114 is specified to be physically arranged in racks that each draw a maximum power level of no more than 3.5 Kilo-Watts, the auto-correct module 326 may generate a certain quantity of racks such that no single rack will draw more than 3.5 Kilo-Watts.

It should be appreciated that the modules described herein are provided only as examples, and that the application 118 may have different modules, additional modules, or fewer modules than those described herein. For example, one or more modules as described in FIG. 3 may be combined into a single module. As another example, certain modules described herein may be encoded on, and executed on other computing systems, such as on one of the resources 112 of the multi-tier computing environment 116.

Figure 4:
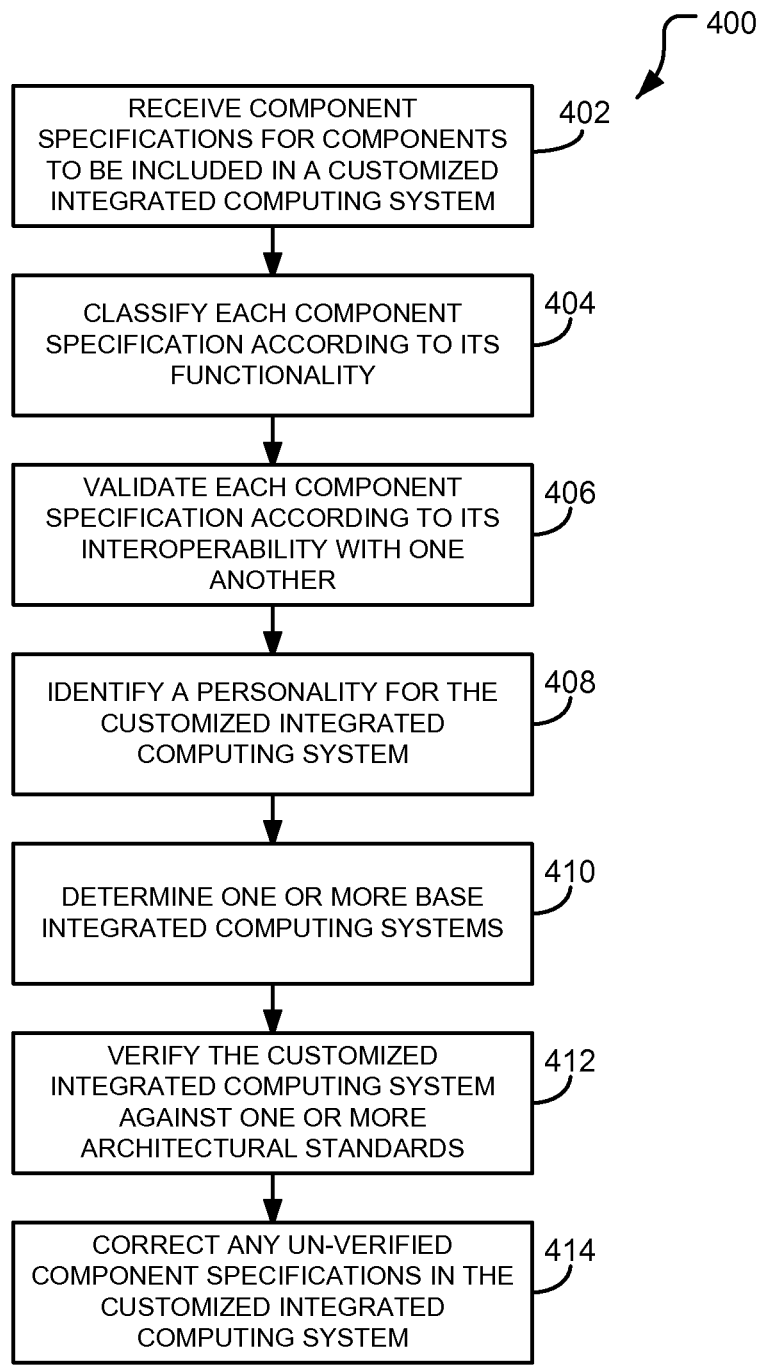
FIG. 4 illustrates an overall process that may be performed by the integrated computing system configuration engine according to one embodiment of the present disclosure.

FIG. 4 illustrates an overall process that may be performed by the integrated computing system configuration engine 104 according to one embodiment of the present disclosure.

In step 402, the integrated computing system configuration engine 104 receives component specifications 108 associated with potential components 110 to be included in a customized integrated computing system 116. The component specifications 108 may be received from a component manufacturer 112 of the components, or from some other suitable source. For example, the component specifications 108 may be received from a file or other type of record that is manually generated using user knowledge known about a component 110. In one embodiment, a group of component specifications 108 associated with a sub-system, such as a blade array, a network switch, or a storage array, may be received by the integrated computing system configuration engine 104.

In step 404, the integrated computing system configuration engine 104 classifies each component specification according to its functionality. For example, the integrated computing system configuration engine 104 may remove information from the component specification that does not identify a particular functional aspect of the component, such as information pertaining to the manufacturer of the component, a serial number (e.g., part number) of the component, and/or a SKU number of the component.

In step 406, the integrated computing system configuration engine 104 validates each component according to its interoperability relative to one another. That is, the integrated computing system configuration engine 104 ensures that all component specifications 108 may be designed to work properly with one another. For example, the integrated computing system configuration engine 104 may validate the components by ensuring their physical dimensions are compatible with one another, by ensuring that they communicate with one another using similar communication protocols, by ensuring that minimum power level requirements for each component is met using any specified power distribution systems, by ensuring that a sufficient level of redundancy is present, and the like.

In one embodiment, the integrated computing system configuration engine 104 may validate certain components using nuances known about those components. For example, it may be known that a first component may function properly with a second component and not work with a third component in spite of the fact that the second component and third component have similar functional parameters. As such, the integrated computing system configuration engine 104 may validate that if the first component is present in the integrated computing system configuration, the second component is also present and not the third component.

In step 408, the integrated computing system configuration engine 104 identifies a personality of the integrated computing system configuration using the component specifications 108. For example, the integrated computing system configuration engine 104 may determine that the integrated computing system configuration is to function primarily as a storage system if it identifies a relatively large quantity of hard disk drives in the integrated computing system configuration. Conversely, the integrated computing system configuration engine 104 may determine that the integrated computing system configuration is to function primarily as a communication node if it identifies a relatively large quantity of network switches in the integrated computing system configuration 114. In each case, the integrated computing system configuration engine 104 may attach a personality to each integrated computing system configuration so that an appropriate set of rules applied to the integrated computing system configuration.

In step 410, the integrated computing system configuration engine 104 determines one or more base integrated computing system configurations that may be suited to be implemented as a customized integrated computing system. For example, an integrated computing system provider may offer several base integrated computing system models for sale wherein each model may be optimized to provide certain benefits. Some of the base integrated computing system models may be optimized to provide certain functionality (e.g., enhanced compute capabilities, enhanced storage capabilities, etc.) while others may be lower end budget models that are well suited for price conscious consumers who can forego the enhanced functionality in favor of a reduced price. Knowledge of the personality obtained in step 408 may be used by the integrated computing system configuration engine 104 to automatically select one or more base integrated computing system configurations that can be selected by the user for implementing as a customized integrated computing system.

In step 412, the integrated computing system configuration engine 104 verifies the integrated computing system configuration according to certain architectural standard rules 120. In one embodiment, the integrated computing system configuration engine 104 may use the personality determined in step 408 to apply certain rules against the integrated computing system configuration. Certain architectural standard rules may apply to certain personalities of integrated computing systems, but not apply to others. For example, an integrated computing system configured for use in a lab environment may not need any significant redundancy, while another integrated computing system configured for use in a high-reliability environment (e.g., an active communication network) may need a significantly higher level of redundancy. Therefore, the integrated computing system configuration engine 104, upon determining that the integrated computing system is to have a communication-based personality, may apply a certain set of rules to ensure that sufficient levels of redundancy are maintained throughout the integrated computing system configuration.

In step 414, the integrated computing system configuration engine 104 may automatically correct any un-verified component specifications in the integrated computing system configuration. The integrated computing system configuration engine 104 may correct the un-verified component specification in any suitable manner, such as replacement of the component specification with another, removal of the component specification 108, addition of new component specifications 108, and the like. The integrated computing system configuration engine 104 may provide for automatic correction or allow manual correction of the un-verified component specification 108. In one embodiment, the integrated computing system configuration engine 104 may access the rule that caused the component specification to fail in order to determine an alternative configuration to fix the un-verified component specification 108. For example, if a component specification fails to pass a particular rule due to some reason (e.g., an insufficient amount of redundancy), the integrated computing system configuration engine 104 may access that particular rule to identify the reason that the component specification and take appropriate remedial actions based upon the information included in the rule (e.g., add additional component specifications such that the minimum level of redundancy is met).

Although FIG. 4 illustrates one example of a process that may be performed by the integrated computing system configuration engine 104 to validate and verify a customized integrated computing system against a set of rules, the process may be embodied in other forms without deviating from the spirit and scope of the present disclosure. For example, the process as described above with reference to FIG. 4 may include additional steps, different steps, or fewer steps than those described herein. Additionally, the steps as described above may be performed in any suitable order and are not limited to any specific sequence, such as their order of description as shown and described herein.

Figure 5:
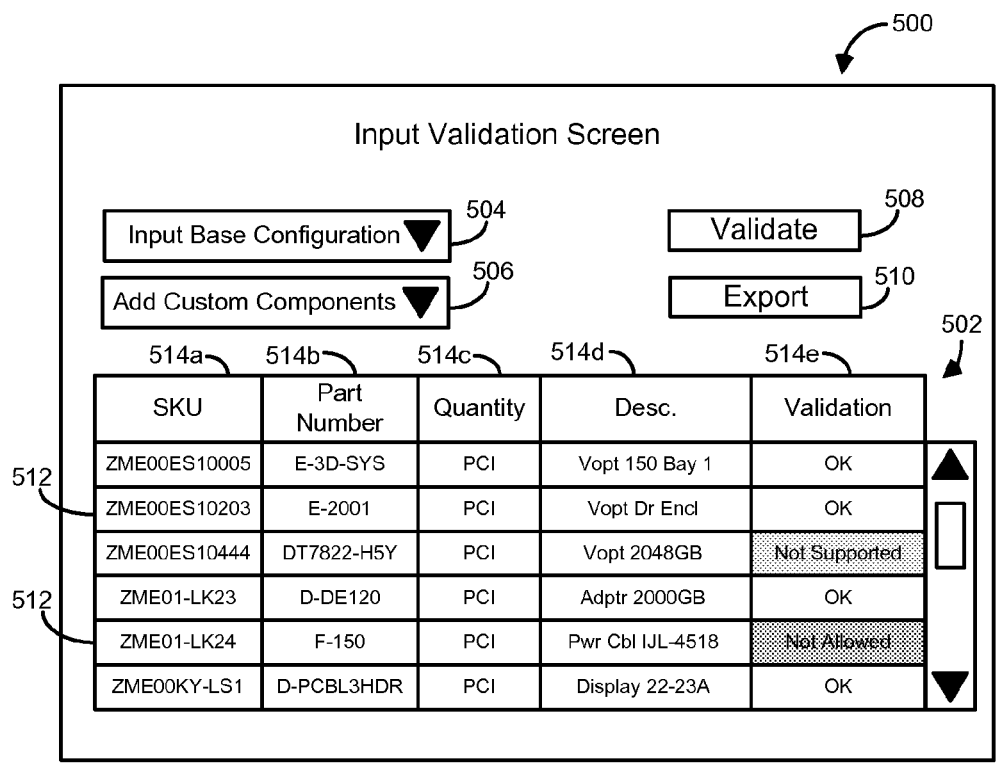
FIG. 5 illustrates an example screenshot of an integrated computing system configuration screen that may be generated by the integrated computing system configuration engine according to one embodiment of the present disclosure.

FIG. 5 illustrates an example screenshot of an integrated computing system configuration screen 500 that may be generated by the integrated computing system configuration engine 104 according to one embodiment of the present disclosure. As shown, the integrated computing system configuration screen 500 includes a table portion 502 that displays each of the component specifications 108, an input base configuration button 504, an 'add custom components' button 506, a 'validate' button 508, and an 'export' button 510. Nevertheless, other embodiments of the integrated computing system configuration screen 500 may include additional, fewer, or other types of structures without departing from the spirit or scope of the present disclosure.

The table portion 502 displays each component in rows 512 and various attributes about each component specification in columns 514. For example, the table portion 502 includes a 'SKU' column 514a indicating a SKU associated with each component specification 108, a 'Part Number' column 514b indicating a unique identifier associated with its respective component specification 108, a 'quantity' column 514c indicating how many instances of its respective component specification are to be included in the customized integrated computing system 114, a 'description' column 514d that displays free form text information about each component specification 108, and a 'validation' column 514e that displays information about whether its respective component specification 108 has been validated or not.

The 'input base configuration' button 504 and 'add custom components' button 506 are used to input component specifications into the table portion 502. For example, the integrated computing system configuration engine 104 may use the 'input base configuration' button 504 to receive user selection of a base integrated computing system configuration from the user, and may use the 'add custom components' button 506 to add additional components not natively included in the base integrated computing system configuration 122. The base integrated computing system configuration may be a new configuration (e.g., associated with a RFQ provided from a customer), or an existing configuration associated with a previously deployed system. Component specifications 108 may be removed from the table portion 502 in any suitable manner. For example, a particular component specification 108 may be removed from the table portion 502 by selecting that component specification 108 and performing a delete operation to remove the component specification 108 from the table portion 502.

The 'validate' button 508 may be used by the integrated computing system configuration engine 104 for validating each component specification 108 included in the table portion 502. As a result of the validation process performed by the integrated computing system configuration engine 104, each component specification of the 'validation' column 510 may display some form of indicia indicating whether or not its respective component specification 108 has been validated. For example, the integrated computing system configuration engine 104 may display an 'OK' message or other similar form of message in the 'validation' column 510 for each component specification 108 that has been validated. For component specifications 108 that have not been validated, however, the integrated computing system configuration engine 104 may display one or more other forms of information indicating that those component specifications 108 have not been validated. For example, the integrated computing system configuration engine 104 may display information indicating why its respective component specification 108 did not pass validation.

In one embodiment, the integrated computing system configuration engine 104 may display non-validated components with differing levels of severity. For example, the integrated computing system configuration engine 104 may display component specifications that will not operate properly with a certain color (e.g., red), while displaying other component specifications 108 that, although will operate properly, may not be supported using the current integrated computing system configuration.

The 'export' button 510 is provided to enable exporting the current integrated computing system configuration as shown in the table portion 502. The integrated computing system configuration 114 may be exported in any form, such as a file that conforms to a particular format, such as an XML format. Additionally, the exported integrated computing system configuration may be exported as a BOM that can be provided to a potential customer and/or used to construct the integrated computing system 116.

Figure 6:
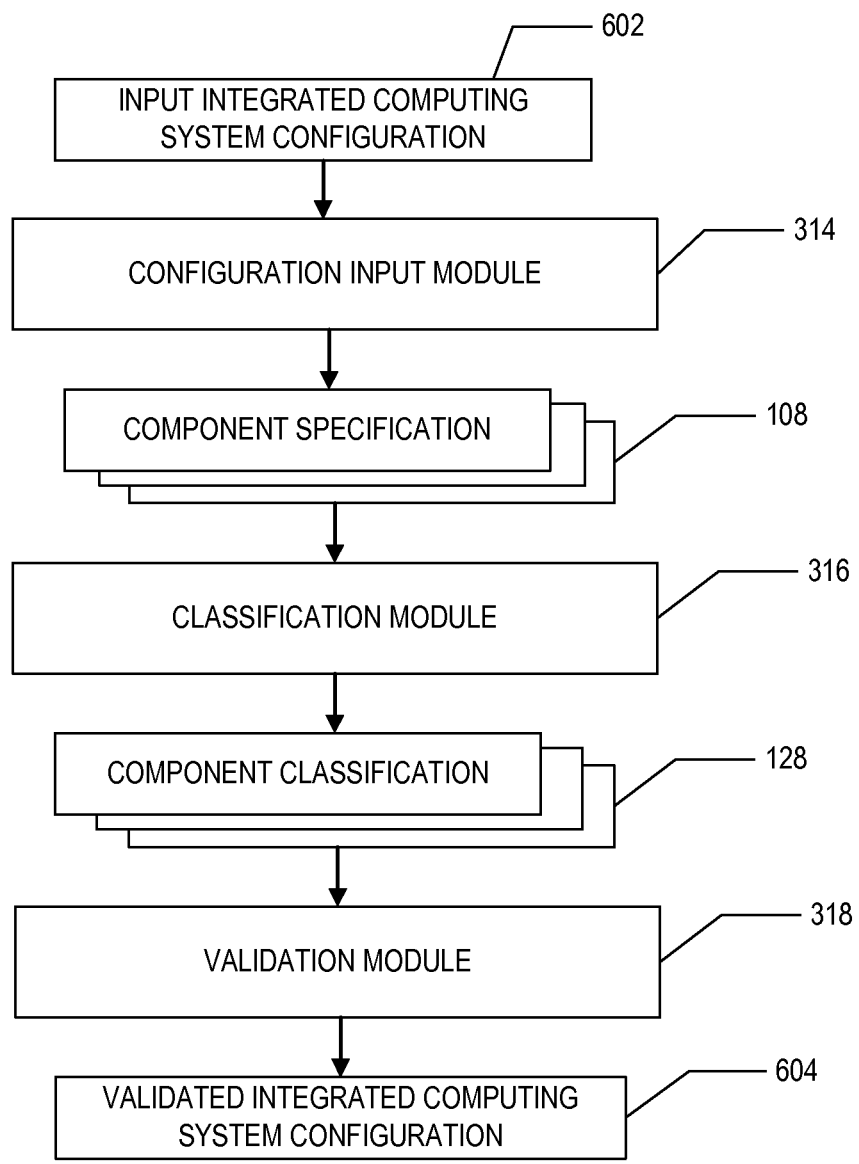
FIG. 6 illustrates an example classification and validation task that may be performed by several of the modules of the integrated computing system configuration engine according to one embodiment of the present disclosure.

FIG. 6 illustrates an example classification and validation task that may be performed by several of the modules of the integrated computing system configuration engine 104 according to one embodiment of the present disclosure. As shown, the classification and validation task is performed by the configuration input module 314, the classification module 316, and the validation module 318. Nevertheless, it is contemplated that the classification and validation task may be performed by fewer, additional, or different module than what is shown and described herein without deviating from the spirit or scope of the present disclosure.

The configuration input module 314 receives an input integrated computing system configuration 602 that may include one or more component specifications 108 from one or more component manufacturers 112. For example, the configuration input module 314 may receive an input integrated computing system configuration 602 using the 'input base configuration' button 504 as described above with respect to FIG. 5. The component specifications 108 may include information associated with a single component or may include information associated with multiple components, such as a sub-system in which the component specifications 108 are provided as part of a BOM. Examples of such computer-based sub-systems may include a blade array comprising multiple computing devices, a storage array network (SAN) having multiple hard disks, a network switch array having multiple independent switches (e.g., routers), and the like that are each housed in an enclosure and controlled by at least one control system, such as a dedicated computing system configured in the housing. In each of these cases, the enclosure, control system, and computing devices, hard disks, and/or switches would each be considered components that are to be classified and validated by the system 100. In one embodiment, the component specifications 108 may be provided as an extensible markup language (XML) file provided by the component manufacturer when the sub-system is delivered to the user.

The configuration input module 314 may receive the input integrated computing system configuration 602 in any suitable manner. For example, the input integrated computing system configuration 602 may be downloaded from a server maintained by the component manufacturer 112 via a communication network, such as the Internet. As another example, the input integrated computing system configuration 602 may be inputted from a storage medium, such as a universal serial bus (USB) flash drive, a compact disk (CD), and/or a digital video disk (DVD). In some cases, most or all of the component specifications 108 provided by certain component manufacturers 112 may be stored in the data source 106 and accessed at runtime by the input configuration module 314 such that the user may successively input and test various combinations of components and/or sub-systems to determine a configuration of the customized integrated computing system 116 that optimally meets the needs of the user.

In one embodiment, the input integrated computing system configuration 602 may include certain sub-systems and other components entered by the user in response to certain performance requirements provided by a customer of the customized integrated computing system 116. For example, a particular request for quote (RFQ) provided by a customer may include a certain level of communication throughput requirements to be provided by the customized integrated computing system 116. As such, the user may select one of multiple switch sub-systems available for configuration by the integrated computing system configuration engine 104 to be included in the list of component specifications 108. Additionally, the RFQ may include certain processing requirements, such as a minimum cumulative level of processing speed (e.g., IPS) to be collectively provided by multiple compute components of the customized integrated computing system 116. Therefore, the user may select one of multiple compute sub-systems that may be capable of meeting this requirement to be included in the list of component specifications 108.

When each component specification 108 is received by the configuration input module 314, it obtains information about for each component in the input integrated computing system configuration 602 and stores the information associated with each component in the data source 106. For example, when the input integrated computing system configuration 602 includes a hard disk drive (HDD) component, the configuration input module 314 obtains information (e.g., manufacturer, part number, etc.) about that HDD by parsing a text string in the component specification 108 to obtain a manufacturer and a part number from which the configuration input module 314 can use to generate a component specification 108 that is stored in the data source 106.

The classification module 316 generates a component classification 128 for each component specification 108 in the input integrated computing system configuration 602. The component classification 128 is generally an abstracted form of the component specification 108 in which only characteristic information is maintained while non-characteristic information (e.g., manufacturer, part number, etc.) that does not specifically pertain to the operation of the component information is removed. For example, when the classification module 316 encounters a HDD component specification of a HDD, it obtains parametric information about that HDD (e.g., storage capacity, access speed, tier type, etc.) and generates a component classification 128 in which the parametric information is stored in the component classification 128. The parametric information may be obtained from any suitable source. For example, the parametric information may be obtained from information included in the component specification 108 and/or from a component specification association record 124 associated with that component. To obtain parametric information from the component specification association record 124, the component classification module 316 may use identifying information (e.g., manufacturer, part number, etc.) obtained from the component specification 108 for accessing a component specification association record 124 associated with the identifying information to obtain the parametric information about the component 110 to be included in the component classification 128.

The validation module 318 obtains the component classifications 128, and exports a validated integrated computing system configuration 604 using the obtained component classifications 128. In general, the validation module 318 provides a second layer of abstraction to the component specifications 108 in that, while the classification module 316 classifies each component 110 according to its individual characteristics, the validation module 318 abstracts information about each component 110 according to its combined usage with other components 110 in the input integrated computing system configuration 602.

The validation module 318 may also display information about whether or not each component specification 108 has been properly validated. For example, the validation module 318 may display an error message for each component specification 108 that has failed validation. The error message may be one of multiple tiers according to the severity of the error. For example, in cases where the error does not cause the input integrated computing system configuration 602 or any components associated with the error to cease operating correctly, a warning error message may be generated, while another error that does cause the input integrated computing system configuration 602 or components associated with the error to cease operating correctly may be generated as a critical error. Additionally, the validation module 318 may provide differing behaviors based upon the severity of the error. For example, the validation module 318 may allow completion of the input integrated computing system configuration 602 for warning error messages, and not allow completion of the input integrated computing system configuration 602 for critical errors. Completion of the input integrated computing system configuration 602 in this context means that the validation module 318 allows the current input integrated computing system configuration 602 to be saved as a validated integrated computing system configuration, or exported to another system, such as one that may be provided in a manufacturing environment to facilitate assembly of the validated integrated computing system configuration 604 into a physical integrated computing system 116.

Figure 7:
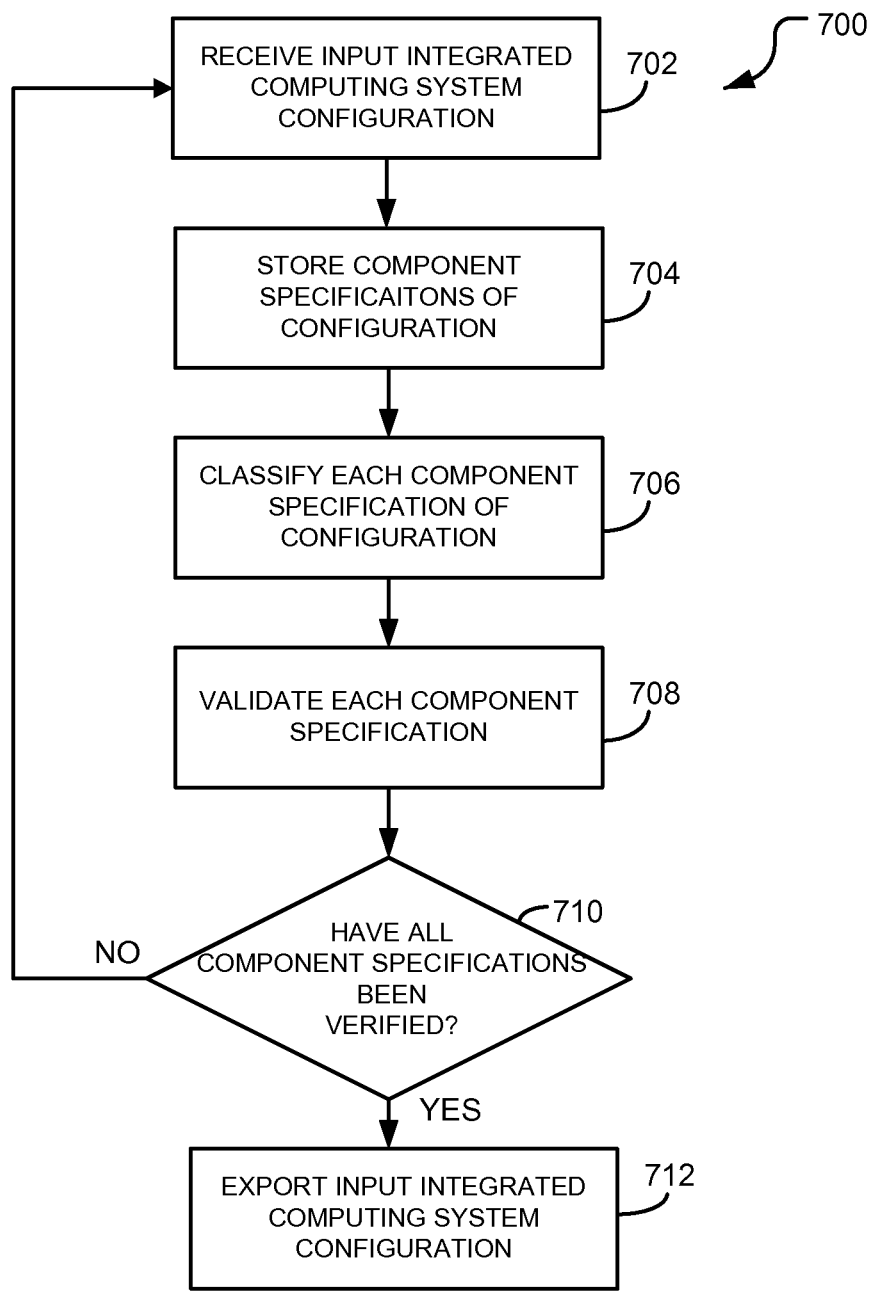
FIG. 7 illustrates an example process that may be performed by various modules of the integrated computing system configuration engine to classify and validate components of an input integrated computing system configuration according to one embodiment of the present disclosure.

FIG. 7 illustrates an example process that may be performed by various modules of the integrated computing system configuration engine 104 to classify and validate components of an input integrated computing system configuration 602 according to one embodiment of the present disclosure.

In step 702, the configuration input module 312 receives component specifications for components available for implementation in the integrated computing system 116. For example, a component manufacturer that manufactures 5 different models or versions of a particular type of component may provide component specifications for each model that includes specific information about each of the component versions. In many cases, the component specifications may be a bill of materials (BOM) of a sub-structure (e.g., a blade array, a storage array, an electrical power distribution system, etc.) that includes parametric information associated with multiple components implemented in that sub-structure. In some cases the component specifications may also comprise a quote that includes pricing information associated with its respective sub-structure. The component specifications 108 may then be stored in the data source 106 for use by the integrated computing system configuration engine 104 in step 704.

In step 706, the classification module 316 classifies each component specification 108 in one of multiple component classifications 128 according to its functionality. For example, the classification module 314 may remove non-functional information (e.g., SKU, part number, component manufacture information, etc.) from the component specification and keep functional information (e.g., processing speed, storage capacity, physical dimensions, etc.).

In step 708, the validation module 318 validates each component specification according to its interoperability with other component specifications 108 included in the input integrated computing system configuration 602. For example, the validation module 318 may include a rule that any disk array enclosures (DAEs) implemented in the integrated computing system configuration 602 be provided with balanced buses (i.e., the DAEs should be provided in pairs). Therefore, when a DAE is encountered by the validation module 318, it may search through the other component classifications 128 to ensure that an even quantity of DAEs is included in the input integrated computing system configuration 602, and if not, generate an error message indicating that the balanced bus rule for DAEs has been violated.

As another example, the validation module 318 may include a rack power rule to ensure that a rack power distribution unit component is specified to handle the electrical power needs of all components 110 configured in its respective rack. For example, the validation module 318 may, upon encountering a particular rack power distribution unit component that is specified to provide up to 3.0 KiloWatts (KW) of power, add the specified power needs of all components 110 to be implemented in that rack and ensure that the cumulative power needs do not exceed the maximum specified power usage of 3.0 KW. If so, the validation module 318 generates a rack power distribution unit component specification 108 that has been validated to this rule, otherwise it generates an error message to the display of the computing system.

If all component specifications 108 have been validated, the validation module 318 may then export the input integrated computing system configuration 602 as a validated integrated computing system configuration 604 in step 712. However, if all component specifications have not been validated, the validation module 318, may continue operation at step 702 such that the input integrated computing system configuration 602 may be modified for continued validation of the component specifications 108 of the input integrated computing system configuration. Nevertheless, when use of the disclosed process is no longer needed or desired, the process ends.

Figure 8:
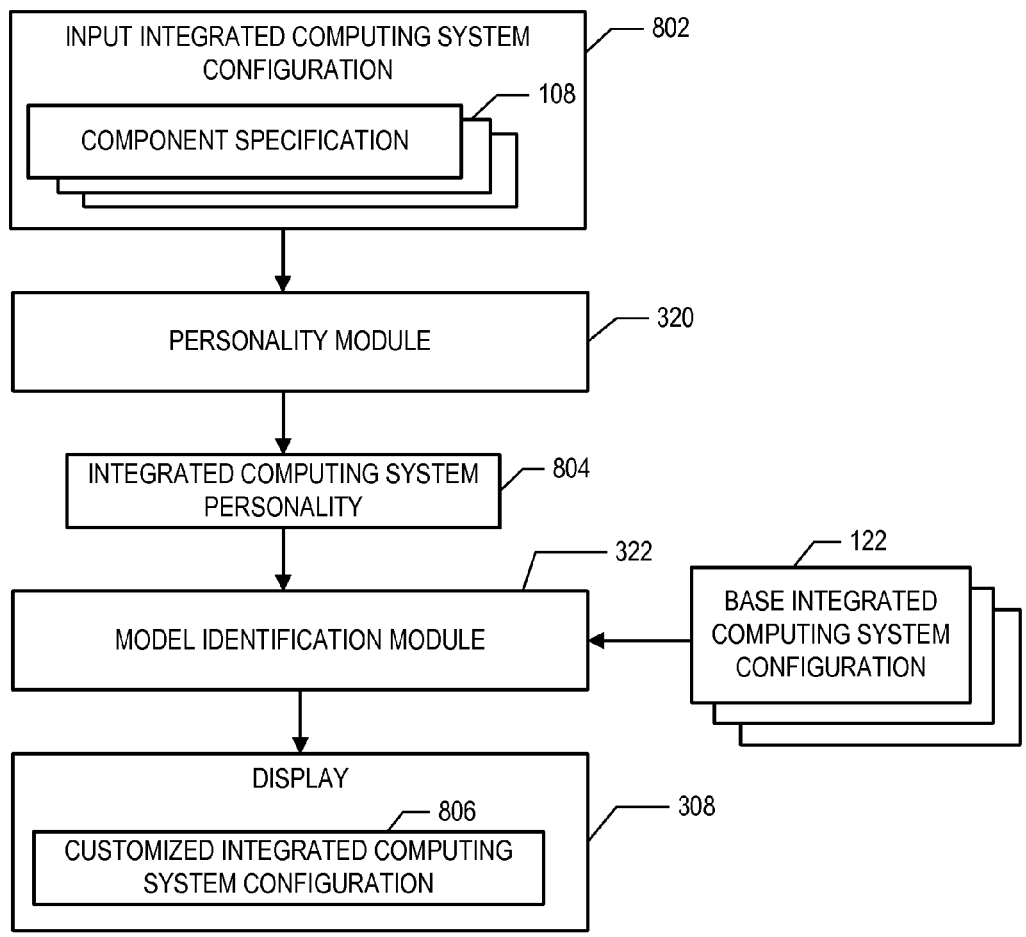
FIG. 8 illustrates an example personality and model identification task that may be performed by several of the modules of the integrated computing system configuration engine according to one embodiment of the present disclosure.

FIG. 8 illustrates an example personality and model identification task 800 that may be performed by several of the modules of the integrated computing system configuration engine 104 according to one embodiment of the present disclosure. As shown, the personality and model task 800 is performed by the personality identification module 320 and the module identification model 322. Nevertheless, it is contemplated that the classification and validation task 800 may be performed by fewer, additional, or different module than what is shown and described herein without deviating from the spirit or scope of the present disclosure.

Initially, the personality identification module 320 receives component specifications 108 of an input integrated computing system configuration 802 to be configured by the system 100, and generates an integrated computing system personality 804 from the received component specifications 108. In one embodiment, the component specifications 108 may include component specifications included in the validated integrated computing system configuration 604 as described above with reference to FIG. 6, or from some other suitable source, such as a BOM of a proposed integrated computing system provided from a user, such as a customer of the customized integrated computing system configuration 806.

The integrated computing system personality 804 generally refers to a type of integrated computing system configuration that the combined group of component specifications 108 may be most be most likely to emulate using one or more personality criteria. For example, when the personality identification module 320 identifies a relatively large quantity of network attached storage component specification 108, it may determine that the configuration of the input integrated computing system configuration 802 is most likely adapted to providing a unified storage system, such as one that can combine locally configured storage mediums (e.g., hard drives, flash drives, etc.) and network attached storage mediums (e.g., network attached storage) using low level system calls that enable seamless operation and/or various redundancy (e.g., redundant array of inexpensive disk (RAID), etc.) schemes. In such a case, the personality identification module 320 generates an integrated computing system personality 804 indicating that the component specifications 108 are associated with an integrated computing system having a unified storage system.

In one embodiment, the personality identification module 320 may utilize nested criteria to determine the integrated computing system personality 804. A nested criteria generally refers to a first (e.g., optional) personality criteria to be applied when a first personality criteria is met. For example, when the personality identification module 320 determines that the component specifications 108 indicate a unified storage personality, it may further examine the component specifications 108 to determine what type of unified storage integrated computing system that an integrated computing system associated with the component specifications 108 may possess. That is, the personality identification module 320 may, upon determining that network components are optimally configured to provide network access to a publicly available communication network, such as the Internet, generate an integrated computing system personality 804 indicating that the component specifications 108 are associated with an integrated computing system having a unified storage system configured to operate using a network-based protocol, such as a lightweight directory access protocol (LDAP).

The personality identification module 320 may also determine a personality according to one or more characteristics associated with certain components associated with the component specifications 108. The characteristics of the components may be any particular type that affects the overall operating performance of the integrated computing system represented by the component specifications 108. Examples of such characteristics may include a combined storage capacity of the storage mediums configured in the integrated computing system (e.g., the quantity of hard drives multiplied by the storage capacity of each hard drive), a combined performance capacity of the compute devices configured in the integrated computing system (e.g., an instruction processing rate of each compute device (e.g., instructions per second (IPS) rate multiplied by the quantity of compute devices configured in the integrated computing system.

The model identification module 322 compares the component specifications 108 and the determined integrated computing system personality 804 with multiple base integrated computing system configurations 122 stored in the data source 106 to generate a customized integrated computing system configuration 806 for display on a display, such as the display 308 of FIG. 3. That is, the model identification module 322 generates a customized integrated computing system configuration 806 that includes some, most, or all components initially specified in the base integrated computing system configuration 122 and additional components as specified in the component specifications 108 to generate the customized integrated computing system configuration 806.

The base integrated computing system configurations 122 refer to various base model integrated computing system types that may be offered for sale by an integrated computing system provider to its customers in which each base integrated computing system configuration 122 represents a particular integrated computing system that may be well suited for a particular purpose, yet is customizable according to each customer's needs. For example, several of the base integrated computing system configurations 122 may be adapted to providing certain levels of performance at relatively low cost, while certain other base integrated computing system configurations 122 provide increased levels of performance at relatively higher costs. As another example, certain base integrated computing system configurations 122 may be adapted to providing enhanced network throughput capabilities at the expense of computing capabilities, while other base integrated computing system configurations 122 may be adapted to providing enhanced computing capabilities at the expense of network throughput. As yet another example, a certain class of base integrated computing system configurations 122 may be based upon a particular network switch sub-system, while another class of base integrated computing system configurations 122 may be based upon another network switch sub-system.

To generate the customized integrated computing system configuration 806, the model identification module 322 receives the component specifications 108 and one or more integrated computing system personalities 804, and determines one or more base integrated computing system configurations 122 that matches the component specifications 108 and integrated computing system personalities 802 to the greatest degree. For example, if the component specifications 108 include compute, networking, and storage components each having a certain level of performance, the model identification module 322 may then select one or more base integrated computing system configurations 122 that have compute, networking, and storage components at or close to that level of performance for each type of component.

For cases where the specified level of performance cannot be entirely met using the base integrated computing system configuration 122, the model identification module 322 may generate additional component specifications to be included in the customized integrated computing system configuration 806. For example, the model identification module 322 may, upon inspection of the component specifications 108 and integrated computing system personality 804, determine that a certain base integrated computing system configuration 122 is most well suited to provide the specified overall performance for the integrated computing system. Nevertheless, the component specifications 108 indicate that a total of 100 compute components are to be implemented, a quantity that is greater than a quantity of 85 compute components included in the base integrated computing system configuration 122. Therefore, the model identification module 322 may then create 15 component specifications associated with 15 additionally compute components to be added to the customized integrated computing system configuration 806 so that the overall quantity of compute components are provided in the customized integrated computing system configuration 806.

The model identification module 322 may also adjust the selection of a base integrated computing system configuration according to the integrated computing system personality 804. The adjustment of selection may be provided in any manner. For example, one or more weighting factors may be associated with each base integrated computing system configuration 122 so that, when the model identification module 322 encounters an integrated computing system personality 804, a weighting factor associated with that type of integrated computing system personality 804 may be applied to increase the likelihood that a base integrated computing system configuration associated with that particular integrated computing system personality 804 is selected by the model identification module 322. For example, when the model identification module 322 obtains an integrated computing system personality 804 indicating that the desired integrated computing system is to be used primarily for storage purposes, it may give higher precedence to those base integrated computing system configurations that are most ideally suited for providing a level of storage specified by the component specifications 108.

Figure 9:
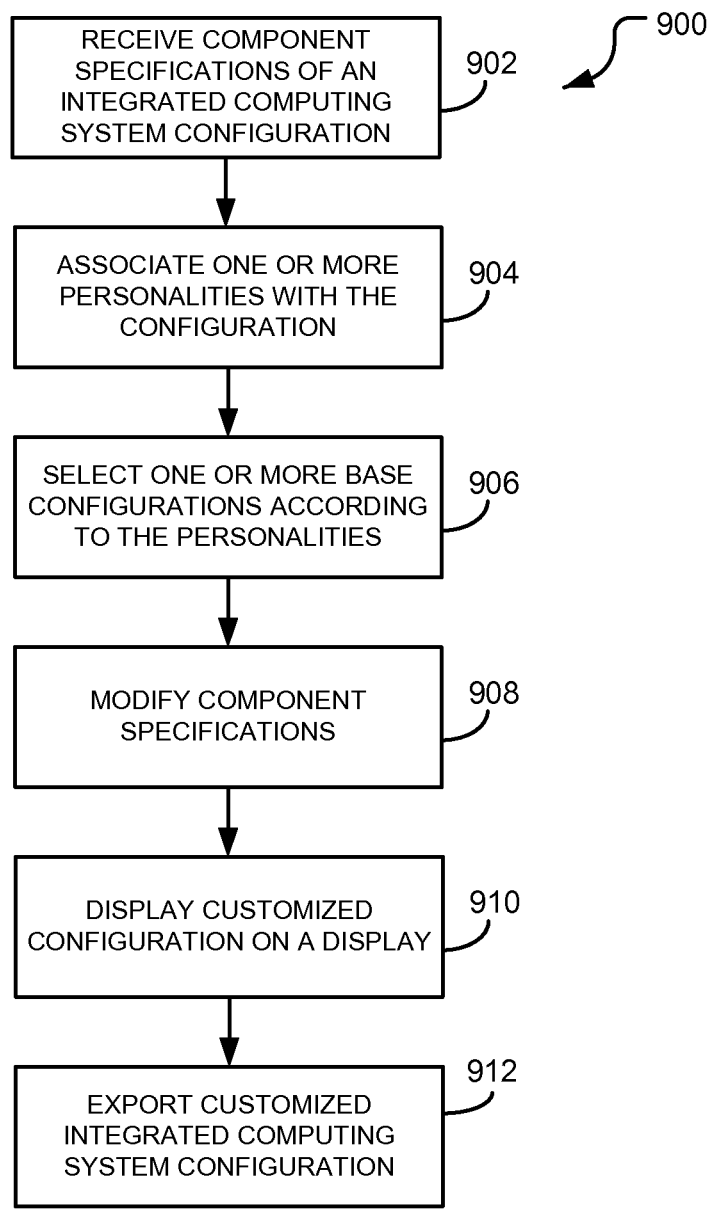
FIG. 9 illustrates an example process that may be performed by the personality identification module and model identification module according to one embodiment of the present disclosure.

FIG. 9 illustrates an example process that may be performed by the personality identification module 320 and model identification module 322 according to one embodiment of the present disclosure.

In step 902, the personality identification module 320 receives component specifications 108 associated with a customized integrated computing system to be provided by an integrated computing system provider to a customer. The component specifications may be provided as part of a request for quote (RFQ), bill of materials (BOM) or other suitable instrument that details and itemizes specified components to be included in the customized integrated computing system. In one embodiment, the component specifications 108 comprise component specifications 108 from a validated integrated computing system configuration 604 as described above with respect to FIG. 6.

In step 904, using the component specifications, the personality identification module 320 associates one or more personalities with the customized integrated computing system configuration. In one embodiment, the personality identification module 320 may generate nested personalities in hierarchal fashion. For example, once the personality identification module 320 determines that the component specifications 108 are related to an integrated computing system optimized for storage, it may determine what kind of storage that the integrated computing system is to be optimized for. Certain embodiments incorporating such behavior may provide an advantage in that a personality may be derived having relatively good detail for optimizing the integrated computing system selection and customization process.

In one embodiment, the personality identification module 320 may generate an integrated computing system personality according to a characteristic associated with most or all component specifications. For example, the personality identification module 320 may identify the cumulative storage capacities of all storage components, and determine a personality of the customized integrated computing system using the combined storage capacity planned for the customized integrated computing system configuration.

In step 906, the model identification module 322 selects one or more base integrated computing system configurations according to the component specifications and integrated computing system personalities generated by the personality identification module 320. In one embodiment, the personality identification module 320 may generate weighting factors for certain base integrated computing system configurations so that those base integrated computing system configurations having capabilities that closely match the generated integrated computing system personalities will have a higher likelihood of being selected by the model identification module 322. Because both the component specifications 108 and components specified in the base integrated computing system configurations 122 may be relatively large in quantity while including numerous complex characteristics, the model identification module 322 may use a regression algorithm, such as a linear regression algorithm or a Gaussian regression algorithm, to identify a base integrated computing system configuration that most accurately matches the component specifications.

In step 908, the model identification module 322 adds and/or removes component specifications from the base integrated computing system configuration such that the component specifications specified for the customized integrated computing system are satisfied. For example, if the base integrated computing system configuration includes 45 compute-based components while only 32 compute-based component specifications 108 are specified, the model identification module 322 may remove 13 compute-based component specifications from the base integrated computing system configuration. Conversely, if 56 compute-based component specifications are specified, the model identification module 322 may add additional component specifications (e.g., a component specification for an additional rack and other component specifications for 11 additional compute-based components to go in the rack) to the base integrated computing system configuration.

In step 910, the model identification module 322 displays the customized integrated computing system configuration on a display for view by a user. In one embodiment, the component specifications 108 originally specified for use in the base integrated computing system configuration are displayed in a first color (e.g., black), while those component specifications added by the model identification module 322 are displayed in a second color (e.g., blue). Additionally, any component specifications 108 that have been determined to be non-compatible with other components specified for use in the customized integrated computing system may be displayed in a third color (e.g., red).

In step 912, the model identification module 322 exports the customized integrated computing system configuration. The customized integrated computing system configuration may be exported as a BOM or other suitable format that includes the list of components along with any configuration parameters to be applied to some or all of the components.

The previous steps described above may be performed again to generate other customized integrated computing system configurations. Nevertheless, when use of the personality identification module 320 and model identification module 322 are no longer needed or desired, the process ends.

Although FIG. 9 describes an example process that may be performed by the personality identification module 320 and model identification module 322 to identify a particular personality for the customized integrated computing system configuration and integrating the customized integrated computing system configuration with one of multiple based integrated computing system configurations, the features of the disclosed process may be embodied in other specific forms without deviating from the spirit and scope of the present disclosure. For example, the personality identification module 320 and model identification module 322 may perform additional, fewer, or different operations than those operations as described in the present example. As another example, the steps of the process described herein may be performed by a system other than the personality identification module 320 and/or model identification module 322, which may be, for example, the configuration input module 314, the classification module 316, the validation module 318, the rules verification module 324, and/or the auto-correct module 322.

Figure 10:
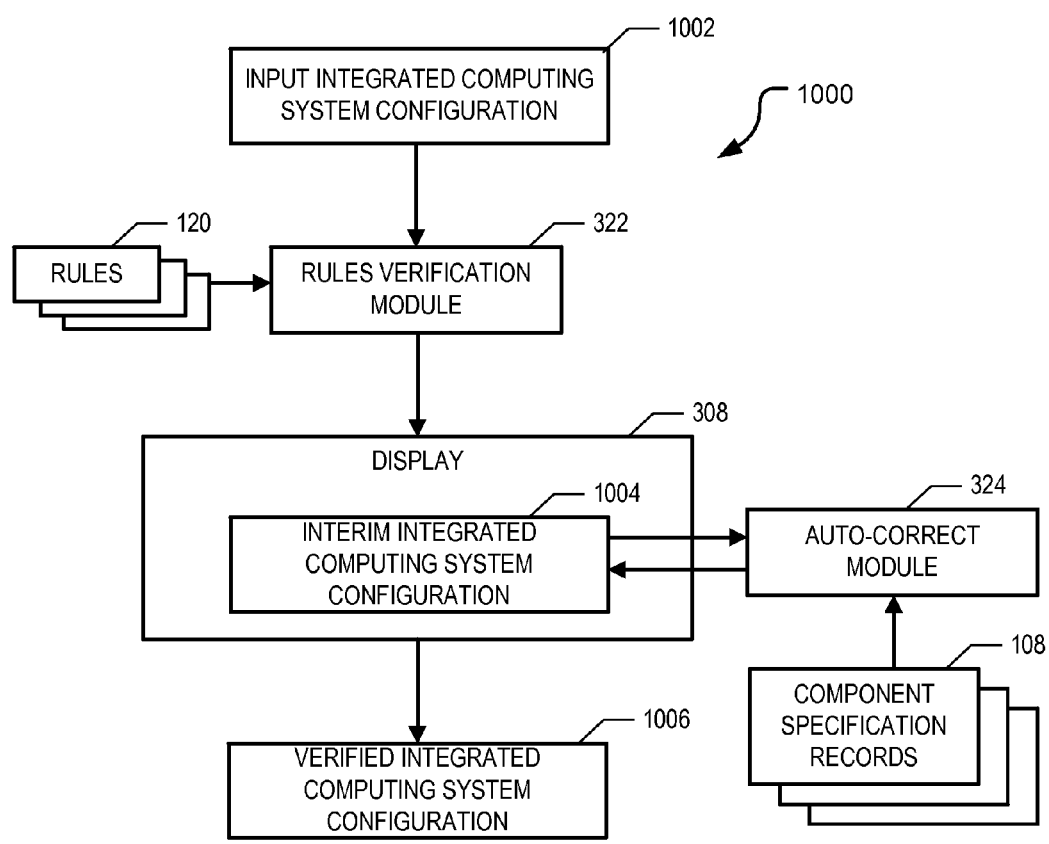
FIG. 10 illustrates an example rules verification task that may be performed by several of the modules of the integrated computing system configuration engine according to one embodiment of the present disclosure.

FIG. 10 illustrates an example rules verification task 1000 that may be performed by several of the modules of the integrated computing system configuration engine 104 according to one embodiment of the present disclosure. The rules verification task 1000 is performed by the rules verification module 320 and the auto-correct module 326. Nevertheless, it is contemplated that the rules verification task may be performed by fewer, additional, or different modules than what is shown and described herein without deviating from the spirit or scope of the present disclosure.

In general, the rules verification task uses one or more rules 120 to ensure that the input integrated computing system configuration 1002 conforms to one or more architectural standards. The input integrated computing system configuration 1002 generally includes a list of component specifications representing components to be integrated into an integrated computing system. In one embodiment, the component specifications of the input integrated computing system configuration 1002 is derived from one or more BOMs to include information associated with their functional type (e.g., compute blade, hard disk drive, power supply, etc.) and one or more performance parameters (e.g., storage capacity, processing speed, etc.), while other extraneous information (e.g., brand name, serial number, etc.) have been removed. For example, the input integrated computing system configuration 1002 may include the customized integrated computing system configuration 804 as shown and described above in FIG. 8.

The rules verification module 322 compares certain component specifications in the received input integrated computing system configuration 1002 against one or more rules 120 stored in the data source 106 to generate an interim integrated computing system configuration 1004 that is displayed on a display, such as the display 308 of FIG. 3. The rules verification module 322 may display those component specifications that that do not pass each of the rules 120 using some form of visual indicia to indicate to the user, that the component associated with that component specification fails to meet at least one architectural standard. The visual indicia may be any type. For example, the rules verification module 322 may display any failed component specifications in a different color than the color that passed component specifications are displayed. For example, failed component specifications may be displayed in a red color, while passed component specifications may be displayed in one or more other colors, such as black or blue.

When all component specifications in the interim integrated computing system configuration 1004 have been validated by the rules verification module 322, the interim integrated computing system configuration 1004 may be exported to a verified integrated computing system configuration 1006 by the rules verification module 322. The verified integrated computing system configuration 1006 generally includes a list of components that have been verified to comply with the rules 120 for ensuring that various architectural standards are met by the combined group of components specified in the verified integrated computing system configuration 1006. In one embodiment, the verified integrated computing system configuration 1006 may comprise at least a portion of a BOM that may be provided to a potential customer who is to purchase an integrated computing system specified by the BOM. Additionally, the rules verification module 322 may include pricing information for each component specification in the BOM and a cumulative final price detailing the overall cost of the integrated computing system represented by the BOM.

When all component specifications in the interim integrated computing system configuration 1004 have not be verified by the rules verification module 322 (e.g., at least one component specification has failed at least one of the rules 120), the user may be blocked (e.g., restricted) from exporting the interim integrated computing system configuration 1004 to the verified integrated computing system configuration 1006. This feature may be provided to inhibit the possibility that an unverified integrated computing system configuration is accidentally exported as a verified integrated computing system configuration 1006. Nevertheless, some cases exist in it would be desirable to export an unverified integrated computing system configuration. For example, the user may know from personal experience that a particular rule causing the failed component specification is not applicable to the integrated computing system configuration sought to be generated, or that the nature of any fault caused by the failed component specification is not sufficiently important to inhibit further implementation of the integrated computing system. In one embodiment, the rules verification module 322 may request login credentials, such as a username and/or password, and only allow the supervisory override functionality when the login credentials are properly entered by the user.

FIG. 11 illustrates an example rules table 1100 according to one embodiment of the present disclosure. The rules table 1100 includes one or more rules 120 each having one or more parameters 1102 that may be used by the rules verification module 322 to verify selected components of the input integrated computing system configuration 1002. In one embodiment, the rules verification module 322 may display the rules table 1100 on the user interface 312 and respond to user input for changing one or more parameters associated with the rules 120, such as modification of existing parameters, deletion of undesired parameters, and/or creation of new parameters.

The rules table 1100 includes multiple rules 120 arranged in rows with parameters 1102 to be associated with each rule 120 arranged in columns. Each rule 120 includes a rules identity parameter 1102a, an array model code parameter 1102b, a personality parameter 1102c, an optional personality parameter 1102d, a component specification parameter 1102e, an operand parameter 1102f, an operand evaluation parameter 1102g, a minimum value parameter 1102h, a maximum value parameter 1102i, a multiple value parameter 1102j, a dependent multiple value parameter 1102k, a dependent value parameter 1102l, and an error message parameter 1102m. Although certain parameters are shown and described herein, other embodiments may include additional, fewer, or different parameters than shown.

Certain parameters for each rule identify certain aspects of the component specification that its respective rule is to be applied to. For example, the component specification parameter 1102*e* indicates the type of component that the rule is to be applied to, which in the particular example shown, is a solid state hard disk drive (SSHDD), and an array model code parameter 1102*b*, which indicates whether the component specification parameter is to be applied when implemented in a certain array model. As shown, multiple rules may be applied to each component specification type. For example, multiple rules may be applied to the SSHDD component specification type. Nevertheless, it should be understood that any component specification may have only one rule, or have a relatively large quantity of rules.

Certain other parameters 1102 determine how its respective rule is applied to a component specification of the input integrated computing system configuration 1002. For example, the array model code parameter 1102*b* may be included with a TRUE/FALSE value indicating whether the rule is to be applied to a certain model of integrated computing system, the personality parameter 1102*c* and optional personality parameter 1102*d* indicates whether the rule is to be applied based on its personality. For example, if the personality of the integrated computing system has been determined to have a particular personality, then a 'TRUE' value indicates that its respective rule is to apply that personality profile against the component specification. Additionally, if any optional personalities exist, then a 'TRUE' value in the optional personality parameter 1102*d* indicates that an optional personality rule is to be applied.

Certain additional parameters may verify that a component specification meets certain specified constraints. For example, the minimum value parameter 1102*h* and maximum value parameter 1102*i* indicates a minimum and maximum value, respectively, that the component specification is supposed to have. The multiple value parameter 1102*j* indicates whether a component specified by the rule is to be provided in multiple values (e.g., in a pair, in a set of three, etc.) within the integrated computing system configuration 1002.

Each rule 120 specifies a particular constraint or condition to be applied to the specified component specification. For example, the rule associated with the rule identity '1' includes a 'TRUE' value for both the personality and optional personality parameters, an 'AND' value for the operand parameter, and a 'TRUE' value for the operand evaluation. Thus, the rules verification module 322 obtains the 'AND' operand parameter, and the 'TRUE' operand evaluation parameter to evaluate both the personality parameter and optional personality parameter and generate the 'Err1' error message specified in the error message parameter if either of the personality and optional personality parameters are not successfully verified.

As yet another example, the rule 120 associated with the rule identify '2' includes a minimum value of '10 GB' such that the rules verification module 322 may generate an 'Err2' message if the SSHDD component specification does not have at least a 10.0 Gigabyte capacity.

As yet another example, the rule 120 associated with the rule identity '3' includes a 'TRUE' value for the personality parameter 1102*c* and a '4 GB' value for the minimum value parameter 1102*h*. Thus, the rules verification module 322 obtains the 'AND' operand parameter 1102*f*, and the 'TRUE' operand evaluation parameter 1102*g* to evaluate both the personality parameter and minimum value parameter 1102*h* to generate an 'Err3' error message specified in the error message parameter 1102*m* if the SSHDD component specification has a personality specified by the personality and the minimum capacity of the SSHDD is less than 4.0 Gigabytes.

As yet another example, the rule 120 associated with the rule identity '4' includes a dependent rule with a value of 'TRUE' indicating that another component specification as identified in the dependent value parameter as 'SKU#' should exist within the integrated computing system configuration 1002. Thus, the rule verification module 322 may use this rule to verify that another component specification (SKU#) is included in the input integrated computing system configuration 1002 and generate an error message 'Err4' if that other component specification does not exist.

Although FIG. 11 illustrate one example rules table 1100 that may be used by the rules verification module 322 to verify component specifications in an input integrated computing system configuration 1002, other embodiments contemplate that other types of rules may be implemented without departing from the spirit and scope of the present disclosure. For example, the rules may be implemented with structures other than a table, such as an XML file that structures the rules according to their type and associated parameters. As another example, the rules may include additional, fewer, or different types of parameters than those that are disclosed herein.

Figure 12A:
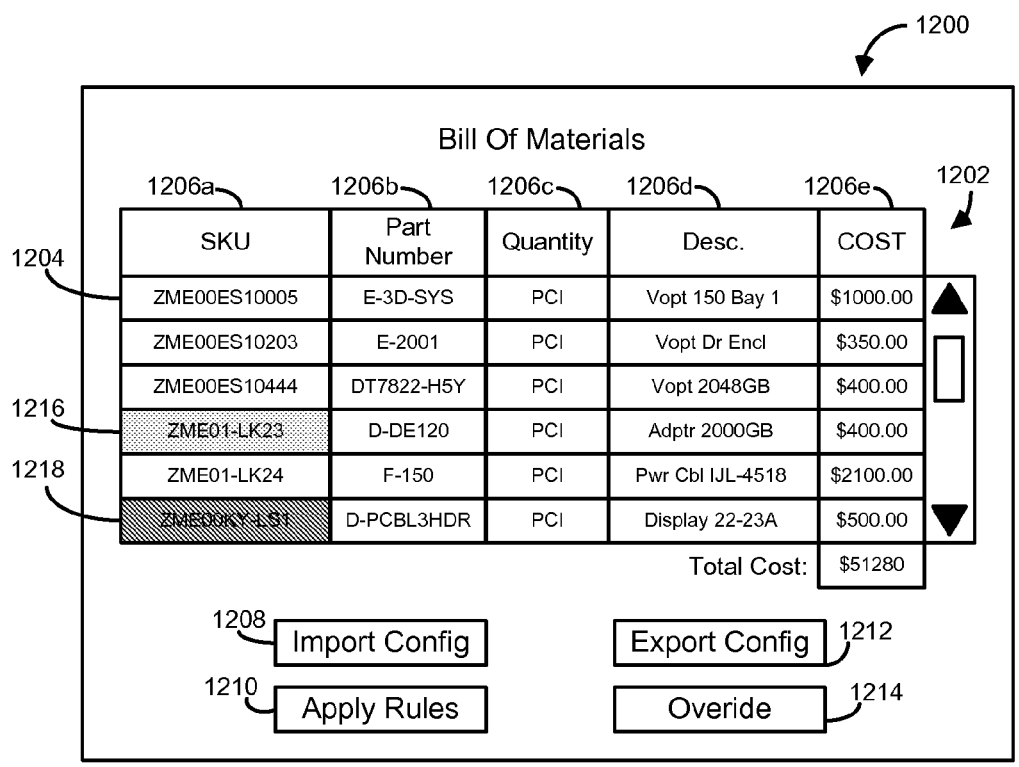
FIGS. 12A and 12B illustrate an example rules verification screen and a physical layout screen that may be displayed by the rules verification module according to one embodiment of the present disclosure.
Figure 12B:
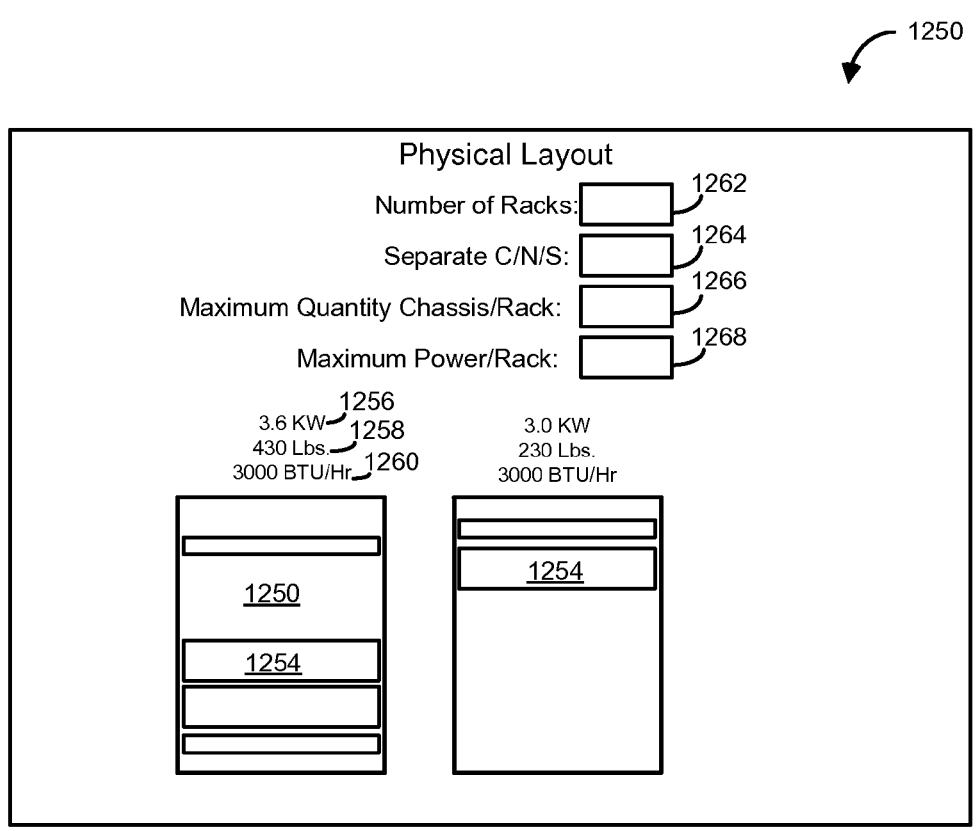

FIGS. 12A and 12B illustrate an example rules verification screen 1200 and a physical layout screen 1250 that may be displayed by the rules verification module 322 according to one embodiment of the present disclosure. The rules verification screen 1200 may be displayed by the rules verification module 324 to display the interim integrated computing system configuration 1004 and other information, such as information pertaining whether each component specification 108 in the interim integrated computing system configuration 1004 has, or has not, been verified according to the rules 120.

The rules verification screen 1200 displays the interim integrated computing system configuration 1004 in a table 1202 having in which component specifications 108 are arranged in rows 1204, while various information associated with each component 110 is arranged in columns 1206. In the particular example rules verification screen 1200 shown, each component 110 includes a SKU column 1206 indicating its respective component's SKU number, a Part Number column 1206 indicating its respective component's part number (e.g., serial number), a quantity column 1206 indicating how many of the components are allocated to the interim integrated computing system configuration 1004, a description column 1206 that provides textual information for user recognition of the component 100, and a cost column 1206 indicating a cost to be associated with the component 110. Although the rules verification screen 1200 shown includes SKU, part number, quantity, description, and cost information, other embodiments may include different, additional, or less information than what is shown and described herein.

The rules verification screen 1200 also includes an 'import config' button 1208, an 'apply rules' button 1210, an 'export config' button 1212, and an 'override' button 1214. The rules 'import config' button 1208 is provided to receive user input for inputting an input integrated computing system configuration 1004 to the rules verification module 324. The 'apply rules' button 1210 is provided to receive user input for instructing the rules verification module 324 to verify each component 110 included in the interim integrated computing system configuration 1004 according to the rules 120 stored in the data source 106. The 'export config' button 1212 is provided to receive user input for instructing the rules verification module 324 to export the verified interim integrated computing system configuration 1004.

In the event that one or more of the components 110 has failed the verification test, however, the rules verification module 324 will inhibit exporting of the interim integrated computing system configuration 1004. In such cases, the 'override' button 1214 is provided to force the interim integrated computing system configuration 1004 to be exported by receiving key information from the user, and comparing the received key information against administration user key information 128 stored in the data source 106 to ensure the user is eligible to force the exporting of the interim integrated computing system configuration 1004.

Each row in the table may include some form of indicia indicating whether its associated component specification has been verified or not. Additionally, the table may include indicia indicating differing tiers of failures for each component specification 108. For example, certain component specifications 108 may include a warning indicia, such as a yellow colored field 1216 indicating that its associated component specification is not supported, but will still allow exporting of the interim integrated computing system configuration 1004 as a verified integrated computing system configuration 1006, while certain other component specifications 108 may include a failure indicia, such as a red colored field 1218 indicating that the failure associated with that particular component is severe enough to inhibit exporting to the interim integrated computing system configuration 1004.

The rack layout screen 1250 displays the physical layout of components 100 in one or more racks. The rack layout screen 1250 includes one or more rack monikers 1252 representing actual racks to house the components 110 of the customized integrated computing system configuration 1006. Additionally, one or more component monikers 1254 may be displayed that represent the arrangement of components 110 in the racks. Various forms of environmental information may be displayed above each rack, such as nominal expected power usage 1256, nominal weight of each rack 1258, and an expected cooling level 1260 to be maintained for each rack.

In general, the rack layout screen 1250 may be provided to enable visualization of the components in the racks and provide for modification of how the components 110 are distributed in the racks to meet certain environmental criteria. Several user input fields may be provided for modifying how the components 110 are arranged in the racks. The user input fields include a 'number of racks' field 1262 for receiving user input to set the number of racks to be allocated for the customized integrated computing system configuration 114, a 'separate compute/network/storage' field 1264 for receiving user input to instruct the system to combine compute, network, and storage components in a single rack, or separate each of the compute, network, and/or storage components in separate racks. Such separation may be useful in certain scenarios, such as due to certain compliance requirements, or power management concerns.

A 'maximum quantity of chassis-per-rack' field 1266 is provided for receiving user input to set the maximum quantity of chassis (e.g., compute, network, and/or storage sub-systems, etc.) that may be allowed in each rack. Additionally, a 'maximum power allocated to each rack' field 1268 is provided for receiving user input for setting the maximum power that may be allocated to each rack. Such information may be useful for scenarios in which a site in which the integrated computing system to be deployed is configured to provide a certain maximum level of electrical power to each rack.

Manipulation of each of the user input fields 1262-1268 may cause the rules verification module 324 to re-arrange the components 110 such that the criteria entered by the user is met. For example, if the maximum electrical power input field 1268 is set to 3.0 Kilo-Watts, the rules verification module 324 determines the nominal power usage of each component 110 in the rack, identifies whether the cumulative power usage exceeds the maximum nominal power level, and creates another rack moniker 1252 to offload certain components 110 from the rack to the newly created rack if the cumulative nominal value exceeds the maximum nominal power level for the rack.

Although FIGS. 12A and 12B illustrate several example screens that may be provided for displaying the integrated computing system configuration and receiving user input to modify the integrated computing system configuration, the screens may be embodied in other specific forms without deviating from the spirit and scope of the present disclosure. For example, the rules verification screen 1200 may display additional, different, or less information about each component than what is shown and described herein. Additionally, the physical layout screen 1250 may display additional, different, or fewer user input fields than what is described herein to manipulate how the components 110 are arranged in the racks.

Figure 13:
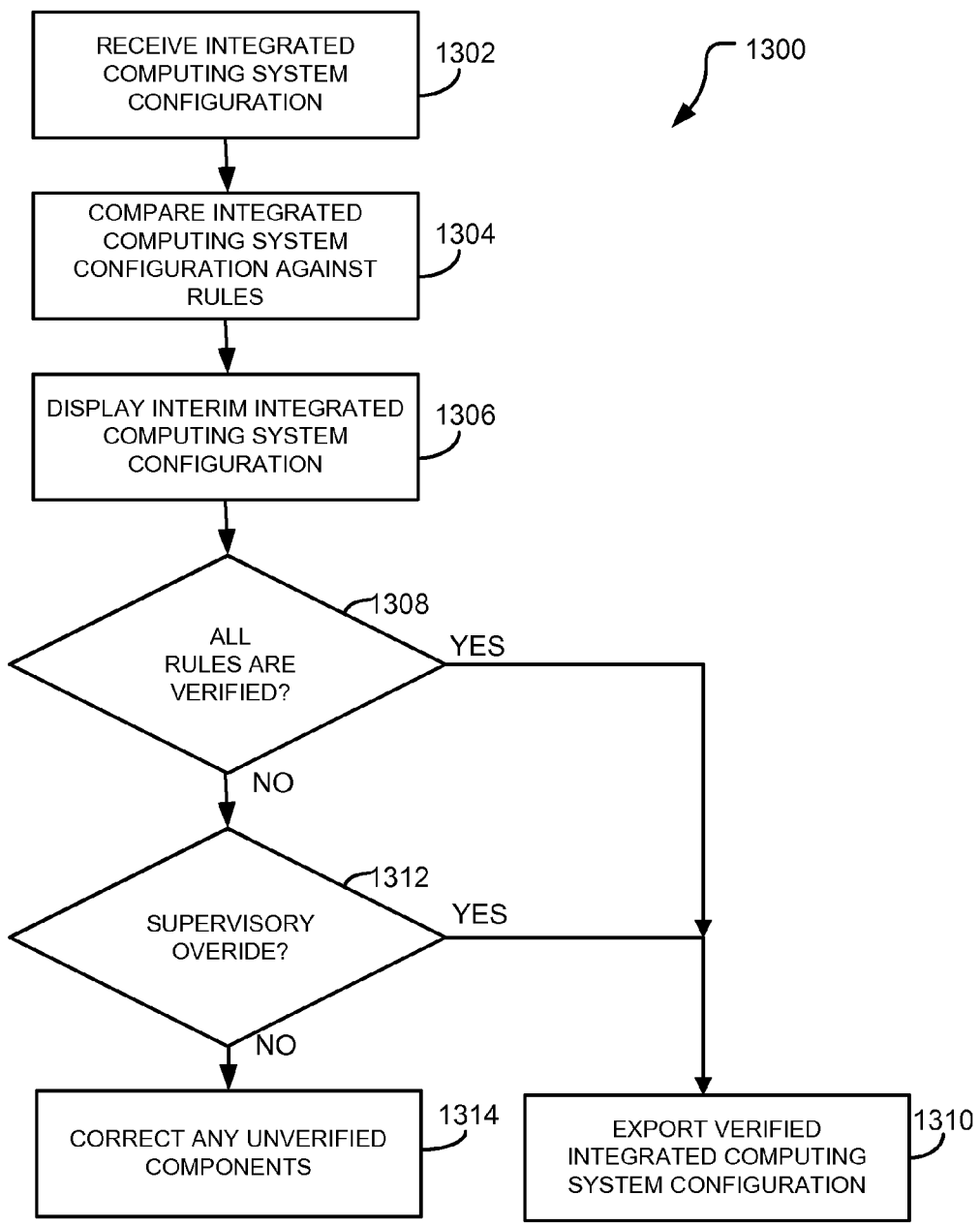
FIG. 13 illustrates an example process that may be performed by the rules verification module and the auto-correct module to generate a verified integrated computing system configuration according to one embodiment of the present disclosure.

FIG. 13 illustrates an example process that may be performed by the rules verification module 322 and the auto-correct module 326 to generate a verified integrated computing system configuration according to one embodiment of the present disclosure.

In step 1302, the rules verification module 322 receives an input integrated computing system configuration 1102. In one embodiment, the input integrated computing system configuration 1102 includes component specifications that have parameters with non-functional parameters (e.g., make, model, part number, serial number, etc.) removed such that only functional parameters (e.g., storage capacity, processing speed, physical dimensions, etc.) remain, such as provided by the model identification module 322 as described above with reference to FIG. 8. In step 1304, the rules verification module 322 compares the component specifications in the input integrated computing system configuration against one or more rules 120. For example, the rules verification module 322 may ensure that the input integrated computing system configuration 1102 having a certain personality (e.g., a storage intensive network node) includes a certain number and type of redundant storage arrays.

The rules verification module 322 then generates an interim integrated computing system configuration 1004 and displays it on a display in step 1306. The interim integrated computing system configuration 1004 generally includes the component specifications as received in the input integrated computing system configuration 1102, but including indicators or flags for those component specifications that failed one or more of the rules 120.

In step 1308, the rules engine 322 determines whether all of the component specifications have been verified. In one embodiment, the rules verification module 322 may generate failure indicators have varying levels of severity according to information included in each rule 120. For example, violation of one particular rule, which may not cause an integrated computing system built according to the interim integrated computing system configuration cease to function properly, yet may cause its availability or reliability to suffer.

Examples of such scenarios include insufficient redundancy of certain components, insufficient surplus electrical power, and the like. Rules designed to flag scenarios such as these may cause the rule module 322 to generate a warning indication, while those that may cause the interim integrated computing system configuration 1004 to cease operating properly may generate a failure indication. Additionally, the rules verification module 322 may block or inhibit exporting of the interim integrated computing system configuration 1004 due to the level of severity. For example, the rules verification module 322 may block exporting of the interim integrated computing system configuration 1004 when a failure indication has been generated, while allowing the export of the interim integrated computing system configuration 1004 when only warning indications have been generated.

If all component specifications in the interim integrated computing system configuration 1004 have been verified (e.g., no severe indications have been generated), the interim integrated computing system configuration may be exported to a verified integrated computing system configuration 1004 in step 1310. However, if at least one of the component specifications of the interim configuration is not verified, processing continues at step 1312.

In step 1312, the rules verification module 322 may provide for a supervisory override in the event that at least one component specification is unverified. For example, the rules verification module 322 may respond to user input requesting that the interim integrated computing system configuration 1004 be exported in spite of the fact that at least one unverified component specification exists, by displaying a request to receive login credentials from the user, and exporting the interim integrated computing system configuration if the login credentials are properly entered. If so, processing continues at step 1310 in which the interim integrated computing system configuration 1004 is exported. If not, however, processing continues at step 1314. Details of how the integrated computing system configuration engine 104 corrects any unverified component specifications are discussed in detail herein below with reference to FIG. 14.

When the unverified components have been corrected, processing continues at step 1302 in which the previously described process may be performed again to verify all component specifications in the interim integrated computing system configuration 1004. Nevertheless, when use of the process as described above is no longer needed or desired, the process ends.

Figure 14:
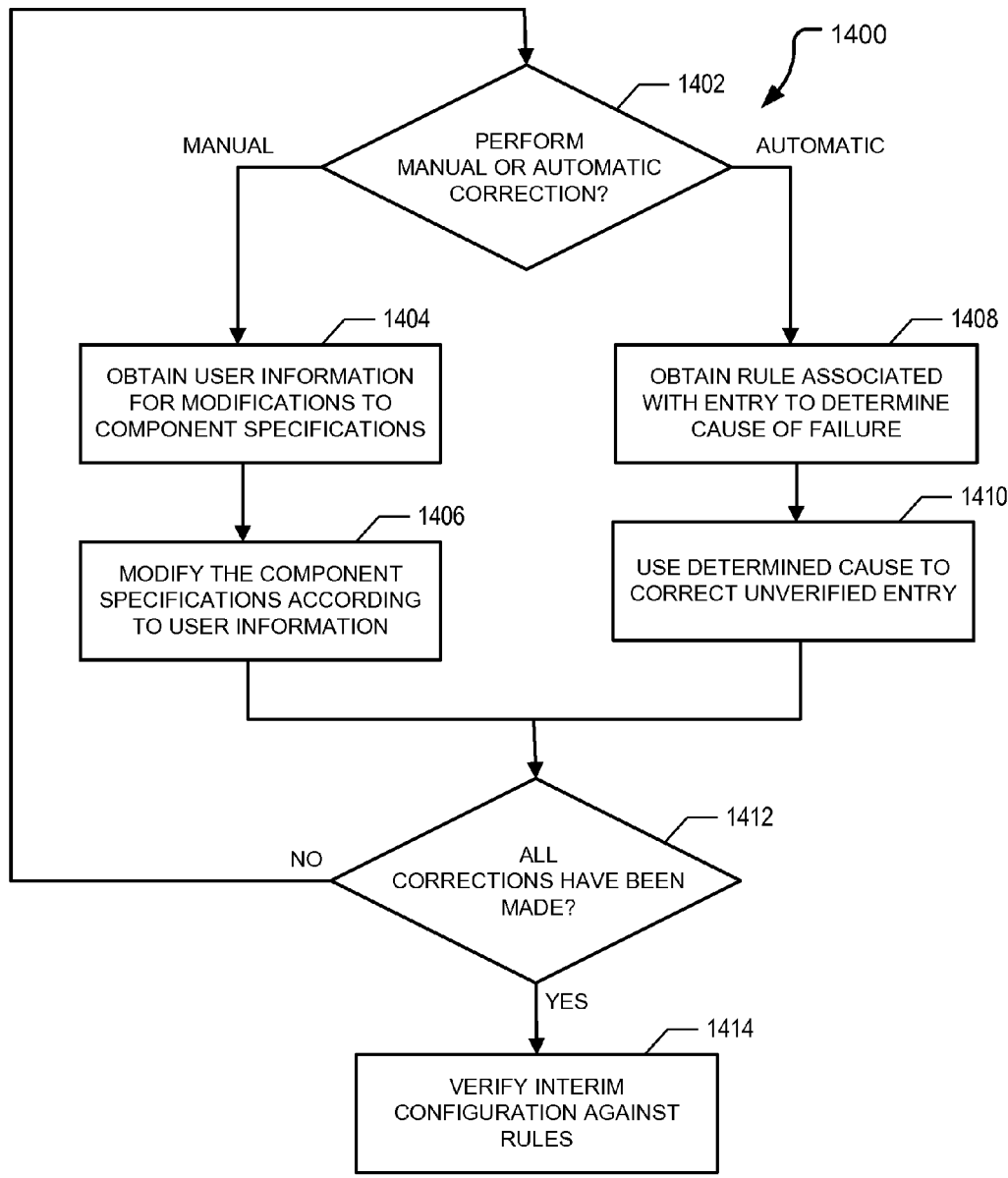
FIG. 14 illustrates an example process that may be performed by the auto-correct module to correct any unverified component specifications in the interim integrated computing system configuration according to one embodiment of the present disclosure

FIG. 14 illustrates an example process 1400 that may be performed by the auto-correct module 326 to correct any unverified component specifications in the interim integrated computing system configuration 1004 according to one embodiment of the present disclosure.

In step 1402, the auto-correct module 326 determines whether an unverified component specification in the interim integrated computing system configuration 1004 is to be manually or automatically fixed. For example, upon selection by the user of an unverified component specification in the table portion 1202 of FIG. 12A, the auto-correct module 326 may display a user input window on the display 308 requesting whether the user wishes to manually correct the unverified component specification or allow the auto-correct module 326 to automatically correct the unverified component specification. If manual correction from the user interface is received, processing continues at step 1404; otherwise, processing continues at step 1408 in which the unverified component specification is automatically corrected.

In step 1404, the auto-correct module 326 receives information from the user for correcting the unverified component specification. The unverified component specification may be corrected in any manner. In one embodiment, the unverified component specification may be corrected by re-arranging one or more components associated with the component specifications in the interim integrated computing system configuration. 1004. For example, the unverified component specification may be corrected by re-purposing an existing component specification to be used in some other fashion such that the unverified component specification is corrected. In another example, the unverified component specification may be replaced with an alternate component specification to correct the unverified component specification. In another example, one or more additional component specifications may be added to correct the unverified component specification. In yet another example, one or more existing component specifications may be removed from the interim integrated computing system configuration 1004 to correct the unverified component specification. Thereafter, the auto-correct module 326 corrects the unverified entry by modifying the component specifications in the interim integrated computing system configuration 1004 as specified by the user in step 1406.

To correct the unverified component specification automatically, however, the auto-correct module 326 continues processing at step 1408. In step 1408, the auto-correct module 326 obtains the rule 120 that generated the failed indicator of that particular unverified component specification to find the cause of the failure. In one embodiment, the interim integrated computing system configuration 1004 may include a tag or other form of identifying means to associate the unverified component specification with the rule 120 that caused it to fail the verification test such that the auto-correct module 326 may determine the root cause of the failure.

For example, if the rule 120 specifies a minimum level of redundancy to be provided by the component associated with the unverified component specification and that minimum quantity of component specifications are not present in the interim integrated computing system configuration 1004, the auto-correct module 326 may calculate the difference between the specified minimum quantity and the quantity of component specifications present in the interim integrated computing system configuration 1004 to determine a quantity of additional components that should be added so that the rule 120 is met.

In step 1410, the auto-correct module 326 uses the cause of failure determined in step 1408 to correct the unverified component specification. For example, the auto-correct module 326 may re-arrange certain components (e.g., re-purpose certain components, re-arrange how certain components are interconnected, select an alternate component, add an additional component specification, remove an existing component specification, etc.). Continuing the example discussed above, if the auto-correct module 326 determines that the root cause of the failure to be an insufficient level of redundancy of the unverified component, it may search through the component specifications 108 stored in the data source 106 to find any additional components that are similar in functionality to the unverified component specification, and add component specifications associated with those components to the interim integrated computing system configuration 1004. In certain cases, the auto-correct module 326 may replicate the existing unverified component specification in the interim integrated computing system configuration 1004 so that the minimum quantity of components exists for providing sufficient redundancy.

Thereafter, when the auto-correct module 326 has facilitated manual correction of the unverified component specification in step 1404, or automatic correction of the unverified component specification in step 1408 through 1410, it may determine whether other unverified component specifications need correction in step 1412. If all unverified component specifications have not yet been corrected, processing continues at step 1402 in which another unverified component specification may be corrected. However, if all unverified component specifications have been corrected, processing may be continued at step 1304 (FIG. 13) in which the auto-correct module 326 transmits the corrected interim integrated computing system configuration 1004 back to the rules verification module 322 so that it may again apply the rules 120 to verify the interim integrated computing system configuration 1004.

The process as described above may be iteratively performed one or more times until all unverified component specifications are corrected in the interim integrated computing system configuration 1004 so that it may be exported as a verified integrated computing system configuration 1006. Nevertheless, when use of the rules verification module 322 and auto-correct module 326 are no longer needed or desired, the process ends.

Although the description of FIGS. 13 and 14 describe example processes that may be performed by the rules verification module 322 and auto-correct module 326 to verify an input integrated computing system configuration 1002, the features of the disclosed process may be embodied in other specific forms without deviating from the spirit and scope of the present disclosure. For example, the rules verification module 322 and/or auto-correct module 326 may perform additional, fewer, or different steps than those steps as described in the present example. As another example, the steps of the process described herein may be performed by other modules in the system 100, such as by the classification module 316, the validation module 318, the personality identification module 320, and/or the model identification module 320.

As described above, embodiments of the present disclosure may provide an environment that allows administrators to describe policies for an application 118 executed in a multi-tier computing architecture. The policies may be related to each of multiple machine classes associated with each tier and a topology of how each machine class may interact with the machine class of other tiers. Additionally, agility of the multi-tier computing environment 116 is enhanced without destroying the ability to accurately and continuously verify compliance. The agility of a multi-tier computing environment generally refers to the ability of the multi-tier computing environment to continually adapt to ongoing changes the multi-tier computing environment's configuration while maintaining an acceptable level of performance. The system 100 provides this agility by continually updating compliance as the configuration changes such that the compliance of resources may be maintained.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 15:
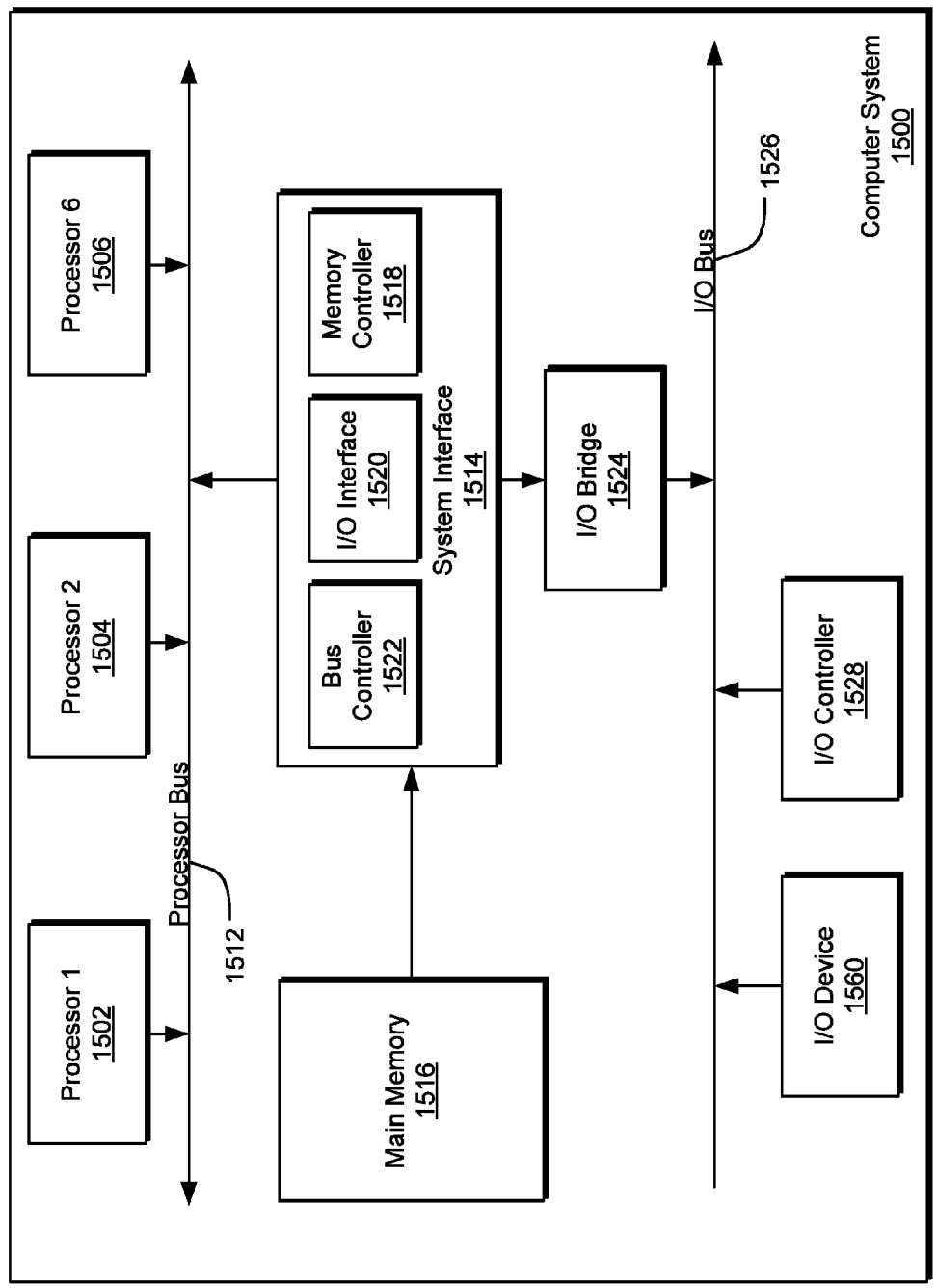
FIG. 15 is a block diagram illustrating an example of a computing device or computer system which may be used in implementing the embodiments of the present disclosure.

For example, FIG. 15 is a block diagram illustrating an example of a host or computer system 1500 which may be used in implementing the embodiments of the present disclosure. The computer system (system) includes one or more processors 1502-1506. Processors 1502-1506 may include one or more internal levels of cache (not shown) and a bus controller or bus interface unit to direct interaction with the processor bus 1512. Processor bus 1512, also known as the host bus or the front side bus, may be used to couple the processors 1502-1506 with the system interface 1514. System interface 1514 may be connected to the processor bus 1512 to interface other components of the system 1500 with the processor bus 1512. For example, system interface 1514 may include a memory controller 1513 for interfacing a main memory 1516 with the processor bus 1512. The main memory 1516 typically includes one or more memory cards and a control circuit (not shown). System interface 1514 may also include an input/output (I/O) interface 1520 to interface one or more I/O bridges or I/O devices with the processor bus 1512. One or more I/O controllers and/or I/O devices may be connected with the I/O bus 1526, such as I/O controller 1528 and I/O device 1530, as illustrated.

I/O device 1530 may also include an input device (not shown), such as an alphanumeric input device, including alphanumeric and other keys for communicating information and/or command selections to the processors 1502-1506. Another type of user input device includes cursor control, such as a mouse, a trackball, or cursor direction keys for communicating direction information and command selections to the processors 1502-1506 and for controlling cursor movement on the display device.

System 1500 may include a dynamic storage device, referred to as main memory 1516, or a random access memory (RAM) or other computer-readable devices coupled to the processor bus 1512 for storing information and instructions to be executed by the processors 1502-1506. Main memory 1516 also may be used for storing temporary variables or other intermediate information during execution of instructions by the processors 1502-1506. System 1500 may include a read only memory (ROM) and/or other static storage device coupled to the processor bus 1512 for storing static information and instructions for the processors 1502-

1506. The system set forth in FIG. 15 is but one possible example of a computer system that may employ or be configured in accordance with aspects of the present disclosure.

According to one embodiment, the above techniques may be performed by computer system 1500 in response to processor 1504 executing one or more sequences of one or more instructions contained in main memory 1516. These instructions may be read into main memory 1516 from another machine-readable medium, such as a storage device. Execution of the sequences of instructions contained in main memory 1516 may cause processors 1502-1506 to perform the process steps described herein. In alternative embodiments, circuitry may be used in place of or in combination with the software instructions. Thus, embodiments of the present disclosure may include both hardware and software components.

A computer readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 1516. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system comprising:
a customized computing system comprising a plurality of components, wherein the customized computing system is configured according to at least one processor and at least one memory to store instructions that are executed by the at least one processor to:
select a plurality of component specifications associated with the plurality of components to be implemented in the customized computing system;
for each selected component:
abstract the component specification to create a component classification that has been abstracted according to a functionality of the component associated with the component specification; and
validate the component classification to create a validated component by verifying that the component classification is interoperable with one or more other component classifications associated with other components of the customized computing system;
apply one or more rules to at least one of the validated component classifications to verify that the customized computing system meets one or more architectural standards; and
when at least one of the rules are not met, perform one or more remedial operations such that the at least one rule is met,
wherein the customized computing system is executed to operate according to the one or more architectural standards.

2. The system of claim 1, wherein the instructions are further executed to receive the component specifications from a plurality of component suppliers that provide the plurality of components.

3. The system of claim 1, wherein the instructions are further executed to select the component specifications by selecting one base computing system configuration from among a plurality of base computing system configurations.

4. The system of claim 3, wherein each base computing system configuration includes a structured combination of the component specifications representing a plurality of the plurality of components to be configured in each of a plurality of sub-systems.

5. The system of claim 1, wherein the instructions are further executed to:
identify a personality of the customized computing system according to a combined functionality of the component specifications, each personality representing a performance characteristic of the customized computing system; and
apply the rules to the validated component classifications according to the identified personality.

6. The system of claim 1, wherein the instructions are further executed to identify a nested set of personalities of the customized computing system according to a combined functionality of the component specifications.

7. The system of claim 1, wherein the instructions are further executed to generate a bill of materials that includes the component specifications, the bill of materials forming a customer price quote for the customized computing system.

8. A method comprising:
selecting, using executable instructions stored in a non-transitory medium and executed on at least one processor, a plurality of component specifications associated with a plurality of components to be implemented in a customized computing system;
for each selected component:
abstracting, using the executable instructions executed by the at least one processor, the component specification to create a component classification that has been abstracted according to a functionality of the component associated with the component specification; and validating, using the executable instructions executed by the at least one processor, the component classification to create a validated component by verifying that the component classification is interoperable with one or more other component classifications associated with other components of the customized computing system;

applying, using the executable instructions executed by the at least one processor, one or more rules to at least one of the validated component classifications to verify that the customized computing system meets one or more architectural standards;

when at least one of the rules are not met, performing, using the executable instructions executed by the at least one processor, one or more remedial operations such that the at least one rule is met; and executing the customized computing system to operate according to the one or more architectural standards.

9. The method of claim 8, further comprising receiving the component specifications from a plurality of component suppliers that provide the plurality of components.

10. The method of claim 8, further comprising selecting the component specifications by selecting one base computing system configuration from among a plurality of base computing system configurations.

11. The method of claim 10, wherein each base computing system configuration includes a structured combination of the component specifications representing a plurality of the plurality of components configured in each of a plurality of sub-systems.

12. The method of claim 8, further comprising:

identifying a personality of the customized computing system according to a combined functionality of the component specifications, each personality representing a performance characteristic of the customized computing system; and applying the rules to the validated component classifications according to the identified personality.

13. The method of claim 12, further comprising identifying a nested set of personalities of the customized computing system according to a combined functionality of the component specifications.

14. The method of claim 8, further comprising generating a bill of materials that includes the component specifications, the bill of materials forming a customer price quote for the customized computing system.

15. Code implemented in a non-transitory, computer readable medium that when executed by at least one processor, is operable to perform at least the following:

selecting a plurality of component specifications associated with a plurality of components to be implemented in a customized computing system;

for each selected component:

abstracting the component specification to create a component classification that has been abstracted according to a functionality of the component associated with the component specification; and validating the component classification to create a validated component verifying that the component classification is interoperable with one or more other component classifications associated with other components of the customized computing system;

applying one or more rules to at least one of the validated component classifications to verify that the customized computing system meets one or more architectural standards;

when at least one of the rules are not met, performing one or more remedial operations such that the at least one rule is met; and executing the customized computing system to operate according to the one or more architectural standards.

16. The code of claim 15, further comprising receiving the component specifications from a plurality of component suppliers that provide the plurality of components.

17. The code of claim 15, further comprising selecting the component specifications by selecting one base computing system configuration from among a plurality of base computing system configurations.

18. The code of claim 17, wherein each base computing system configuration includes a structured combination of the component specifications representing a plurality of the plurality of components configured in each of a plurality of sub-systems.

19. The code of claim 17, further comprising identifying a nested set of personalities of the customized computing system according to a combined functionality of the component specifications.

20. The code of claim 15, further comprising generating a bill of materials that includes the component specifications, the bill of materials forming a customer price quote for the customized computing system.

* * * * *